Dec. 15, 1931.                P. A. HUNKER                1,836,074
                    GEAR RATIO CHANGING MECHANISM
                    Filed Sept. 12, 1927        11 Sheets-Sheet 1
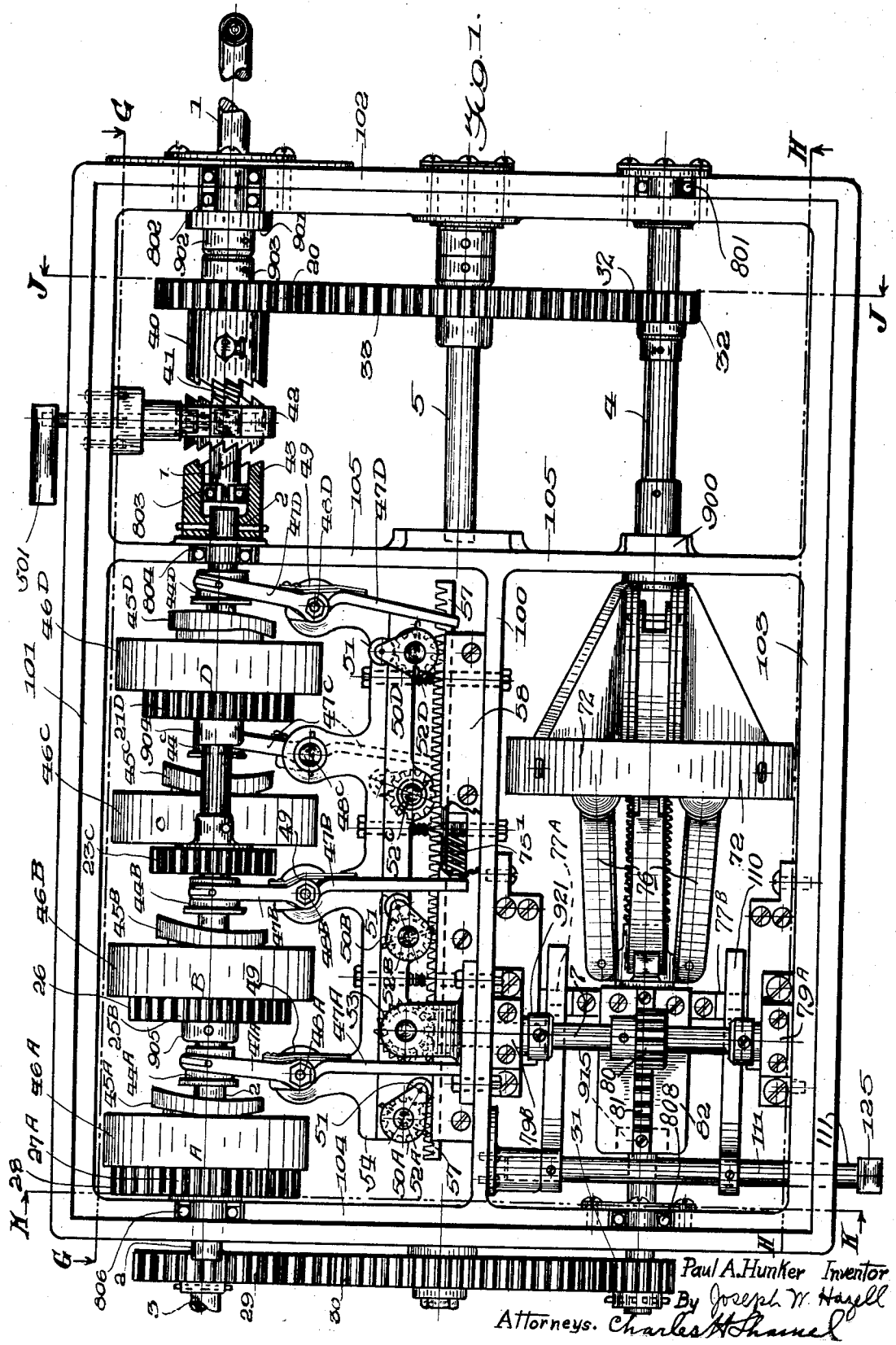
Paul A. Hunker Inventor
By Joseph W. Hazell
Attorneys. Charles H. Shanel

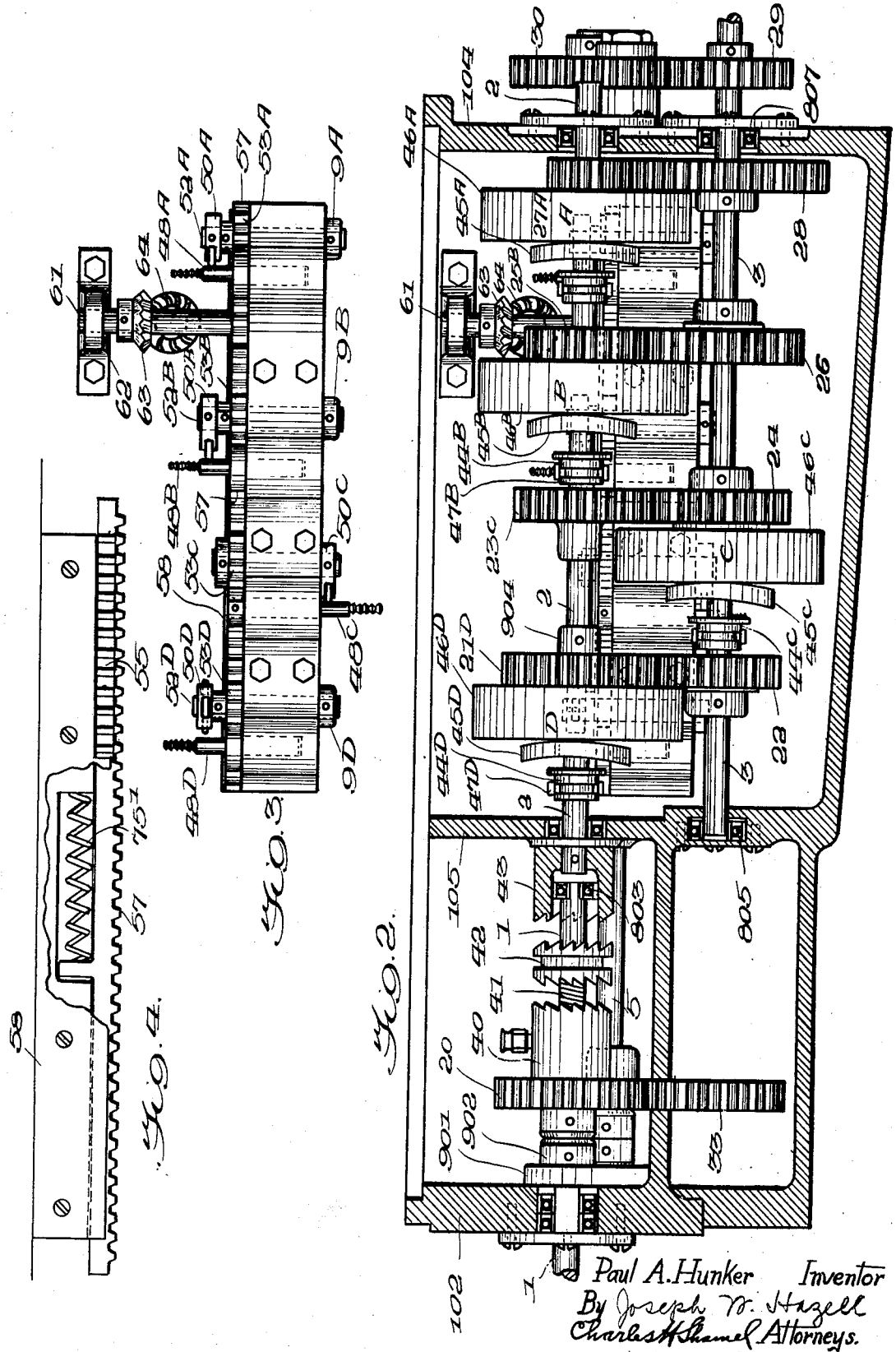

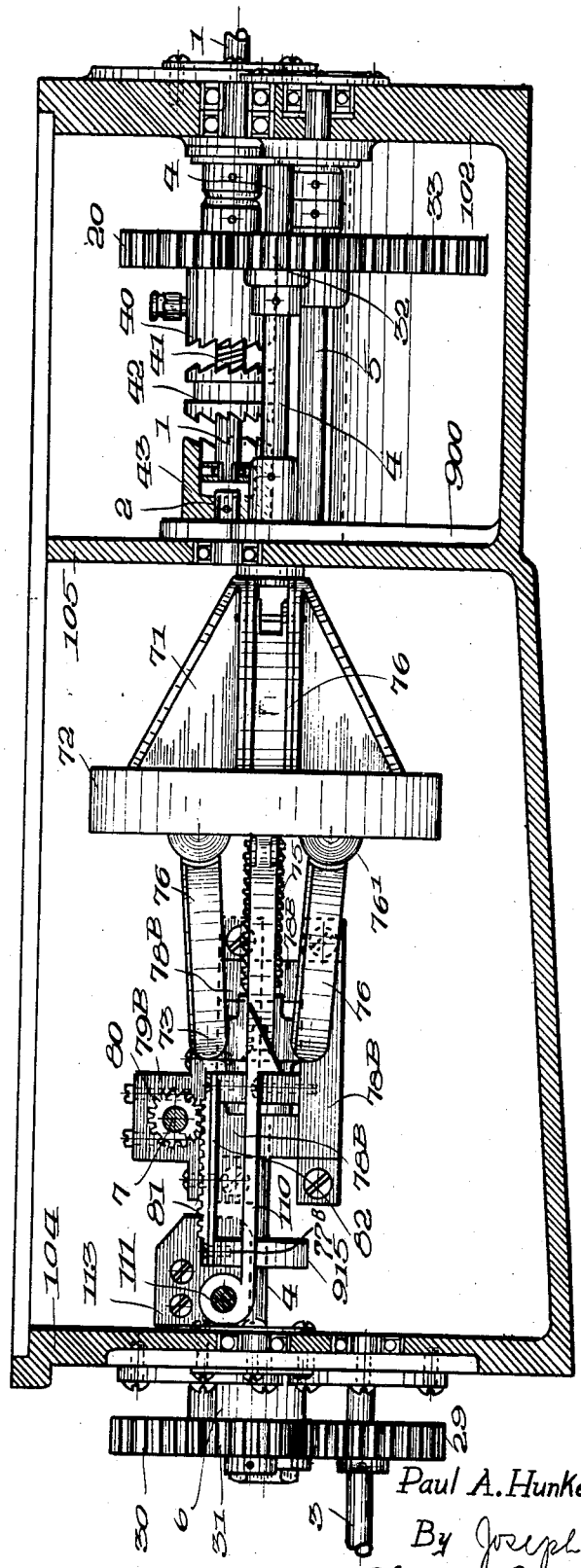

Dec. 15, 1931.            P. A. HUNKER            1,836,074
GEAR RATIO CHANGING MECHANISM
Filed Sept. 12, 1927        11 Sheets-Sheet 4
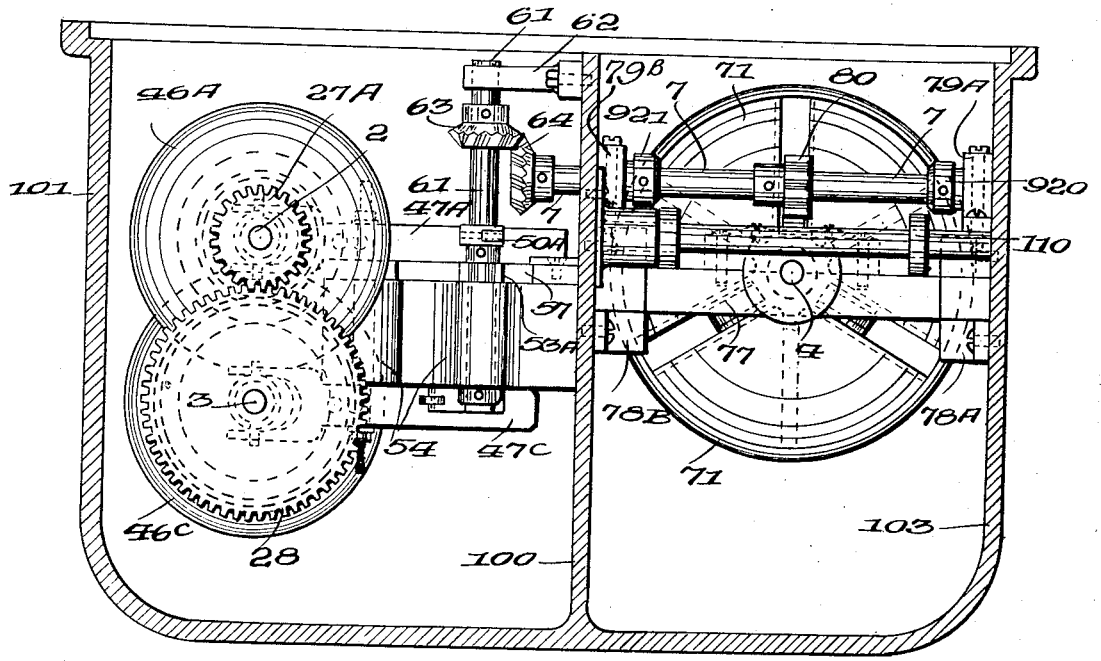
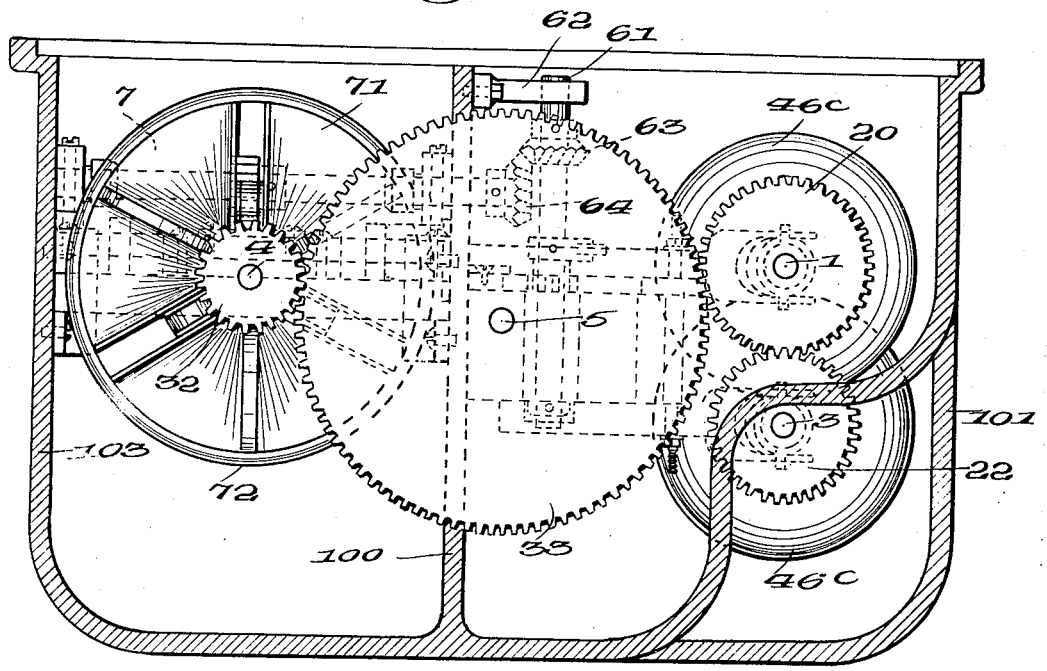
Paul A. Hunker  Inventor
By Joseph W. Hazell
Charles H. Shamel Attorneys.

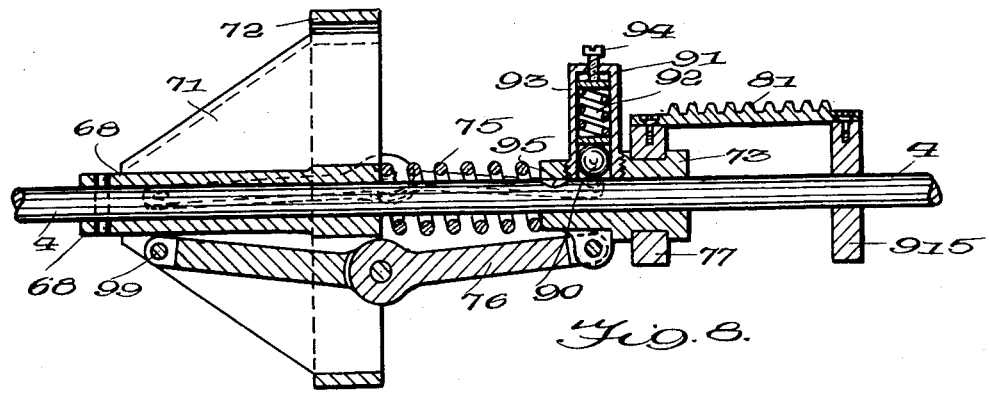
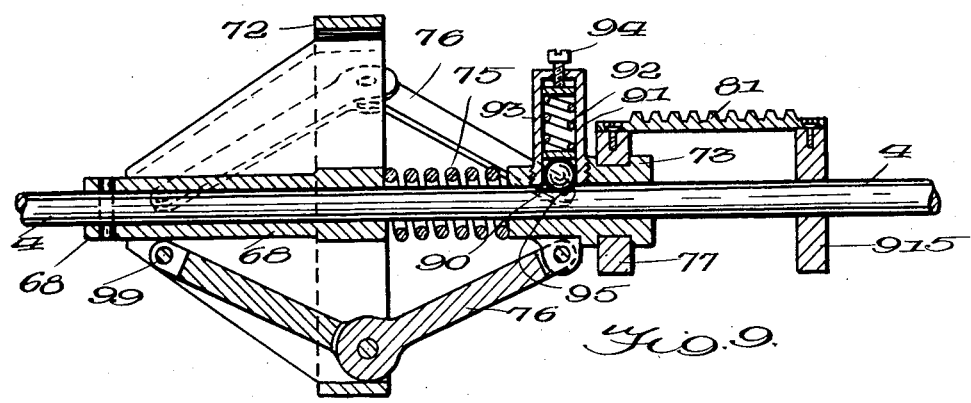
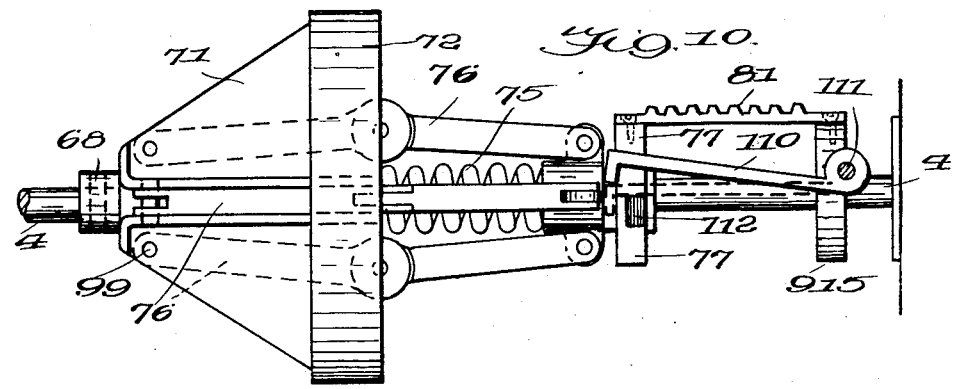
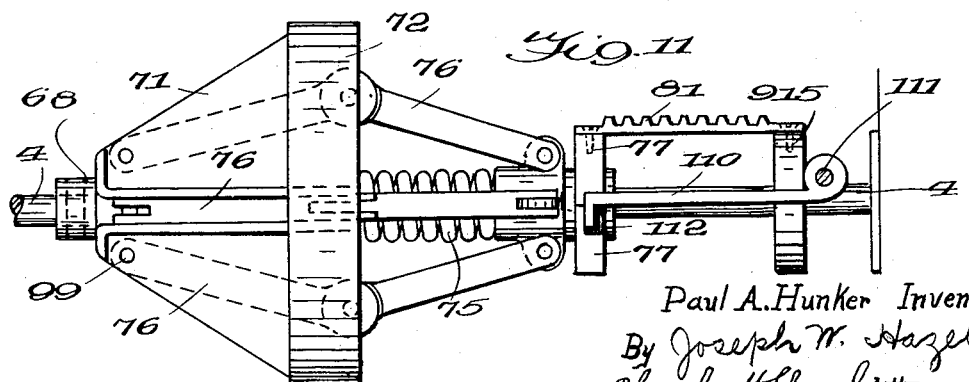

Dec. 15, 1931.　　　　P. A. HUNKER　　　　1,836,074
GEAR RATIO CHANGING MECHANISM
Filed Sept. 12, 1927　　　11 Sheets-Sheet 6
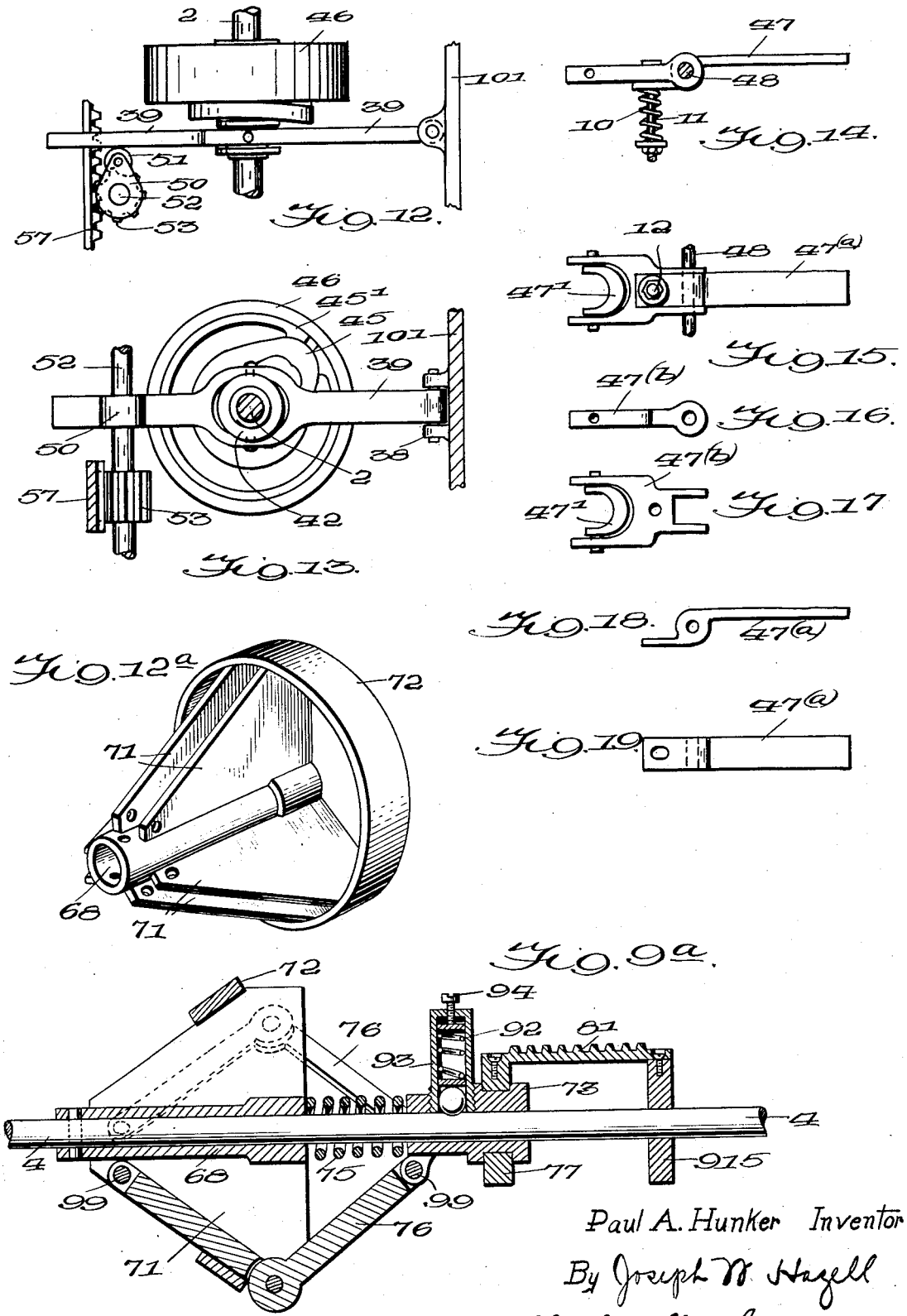
Paul A. Hunker Inventor
By Joseph W. Hagell
Charles H. Shamel Attorneys.

Dec. 15, 1931.  P. A. HUNKER  1,836,074
GEAR RATIO CHANGING MECHANISM
Filed Sept. 12, 1927  11 Sheets-Sheet 7
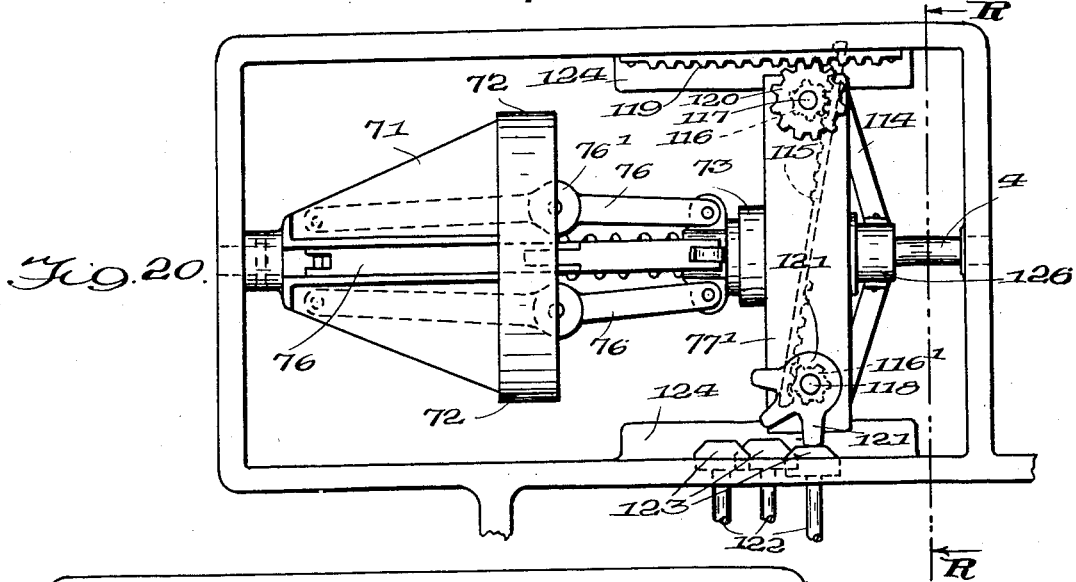
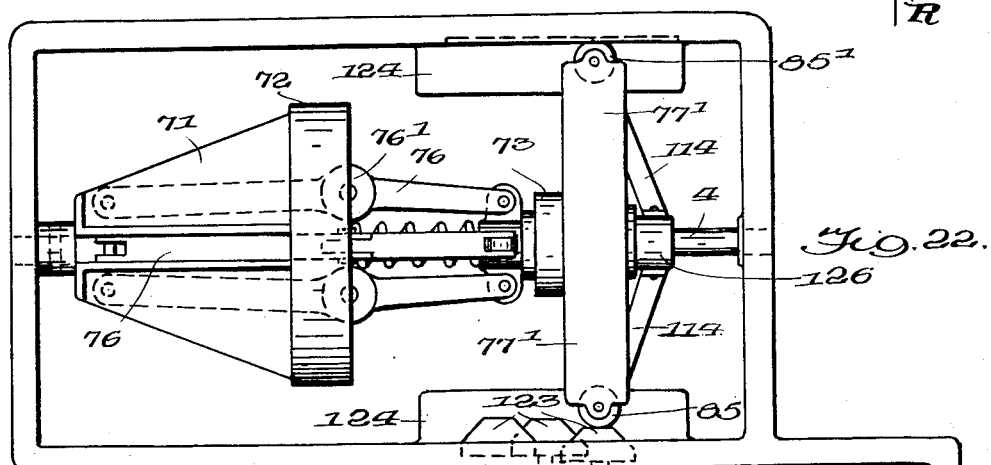
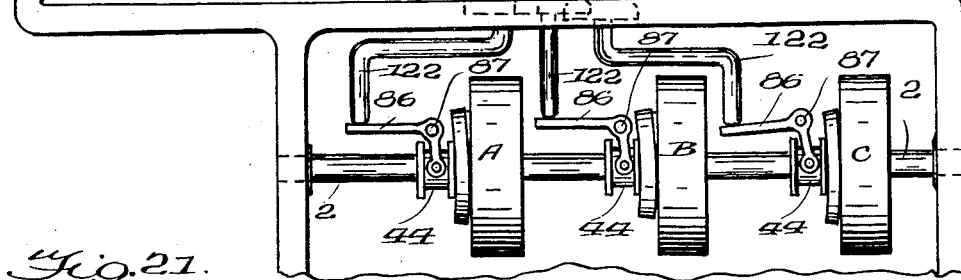
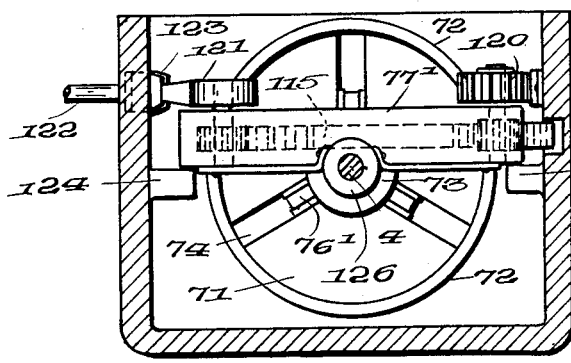
Paul A. Hunker  Inventor
By Joseph W. Hazell
Charles H. Shamel  Attorneys.

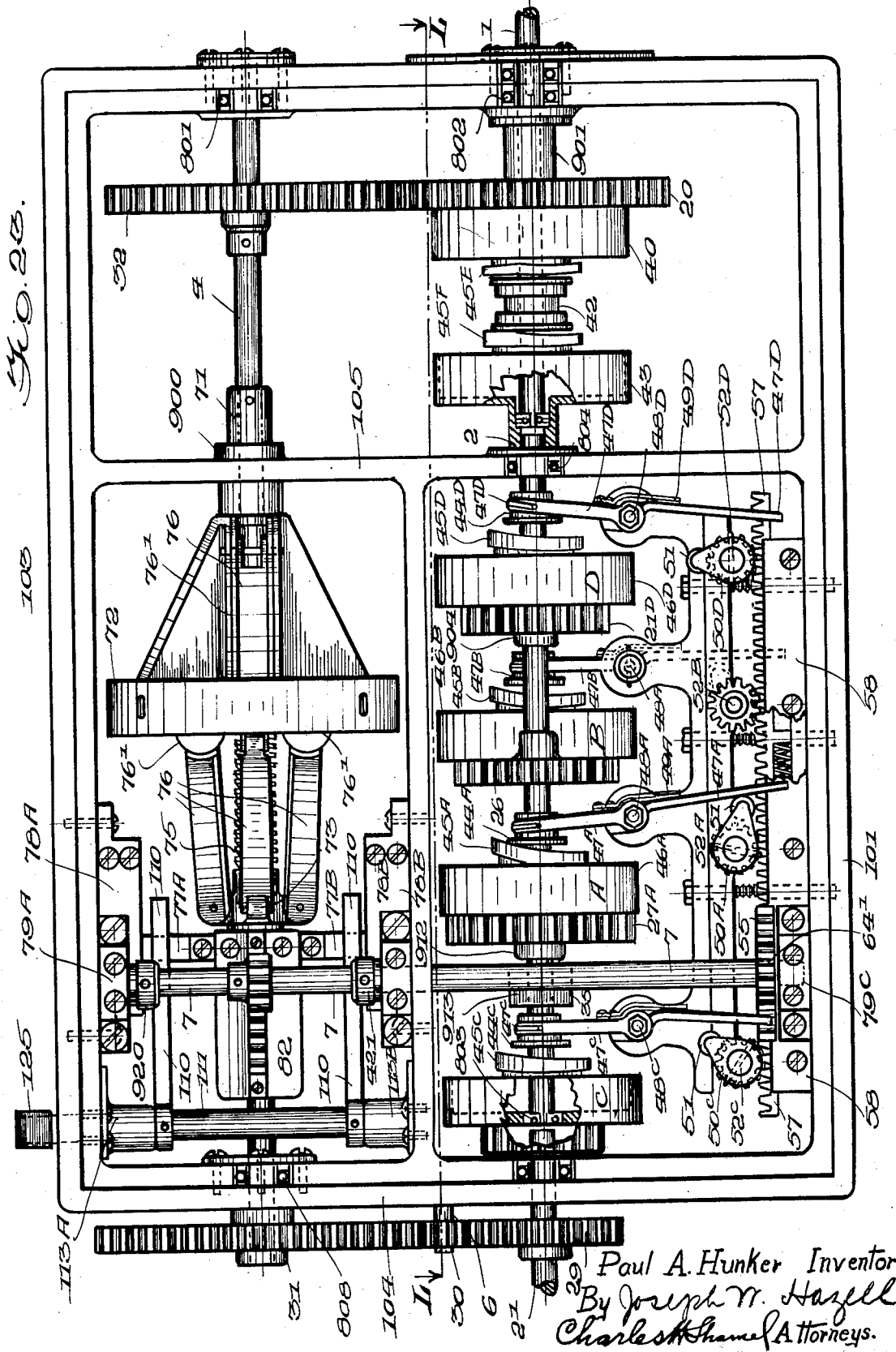

Dec. 15, 1931.          P. A. HUNKER                    1,836,074
                   GEAR RATIO CHANGING MECHANISM
                Filed Sept. 12, 1927        11 Sheets-Sheet 9
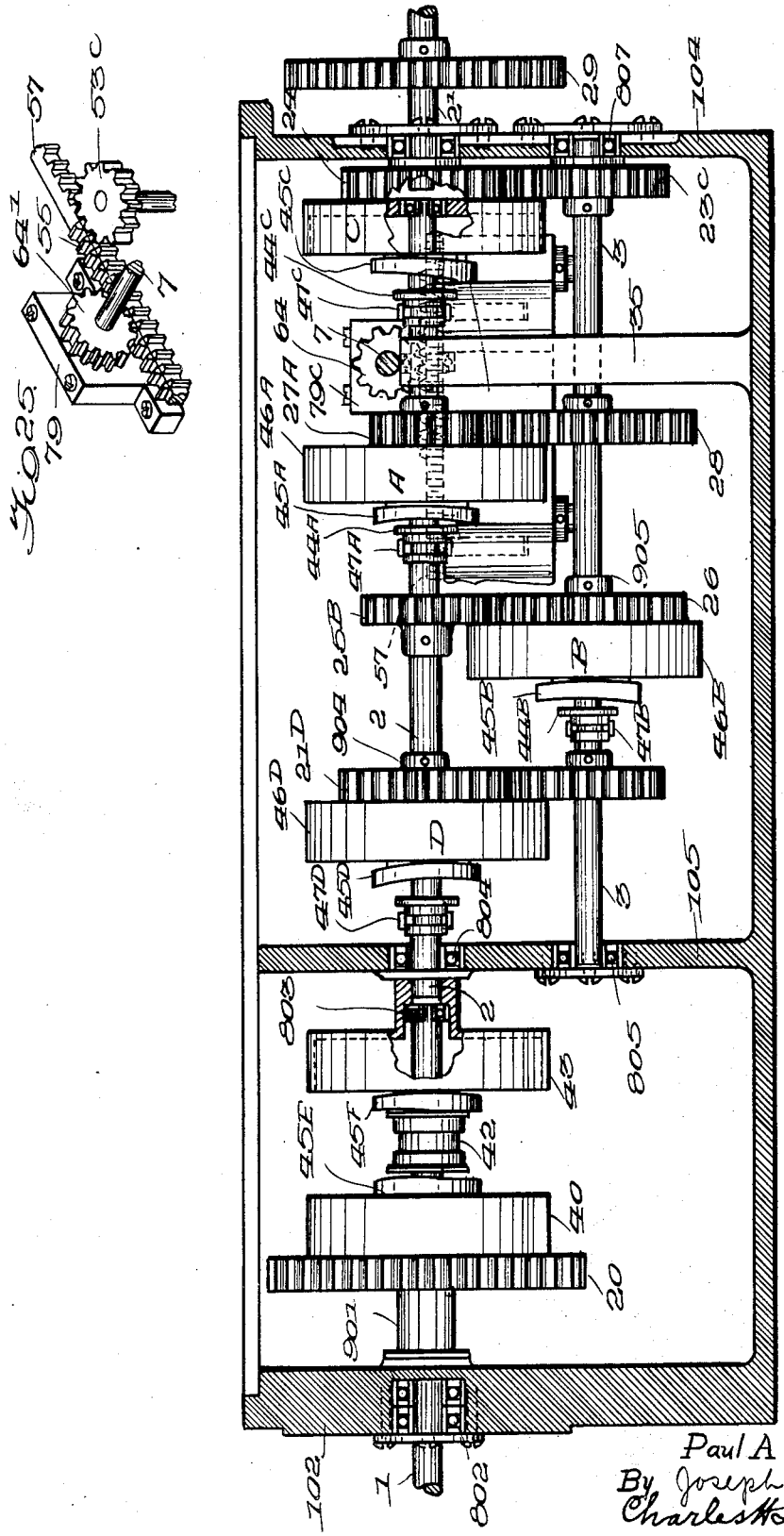
Paul A. Hunker  Inventor
By Joseph N. Hazell
Charles W. Shamel Attorneys.

Dec. 15, 1931.   P. A. HUNKER   1,836,074
GEAR RATIO CHANGING MECHANISM
Filed Sept. 12, 1927   11 Sheets-Sheet 10
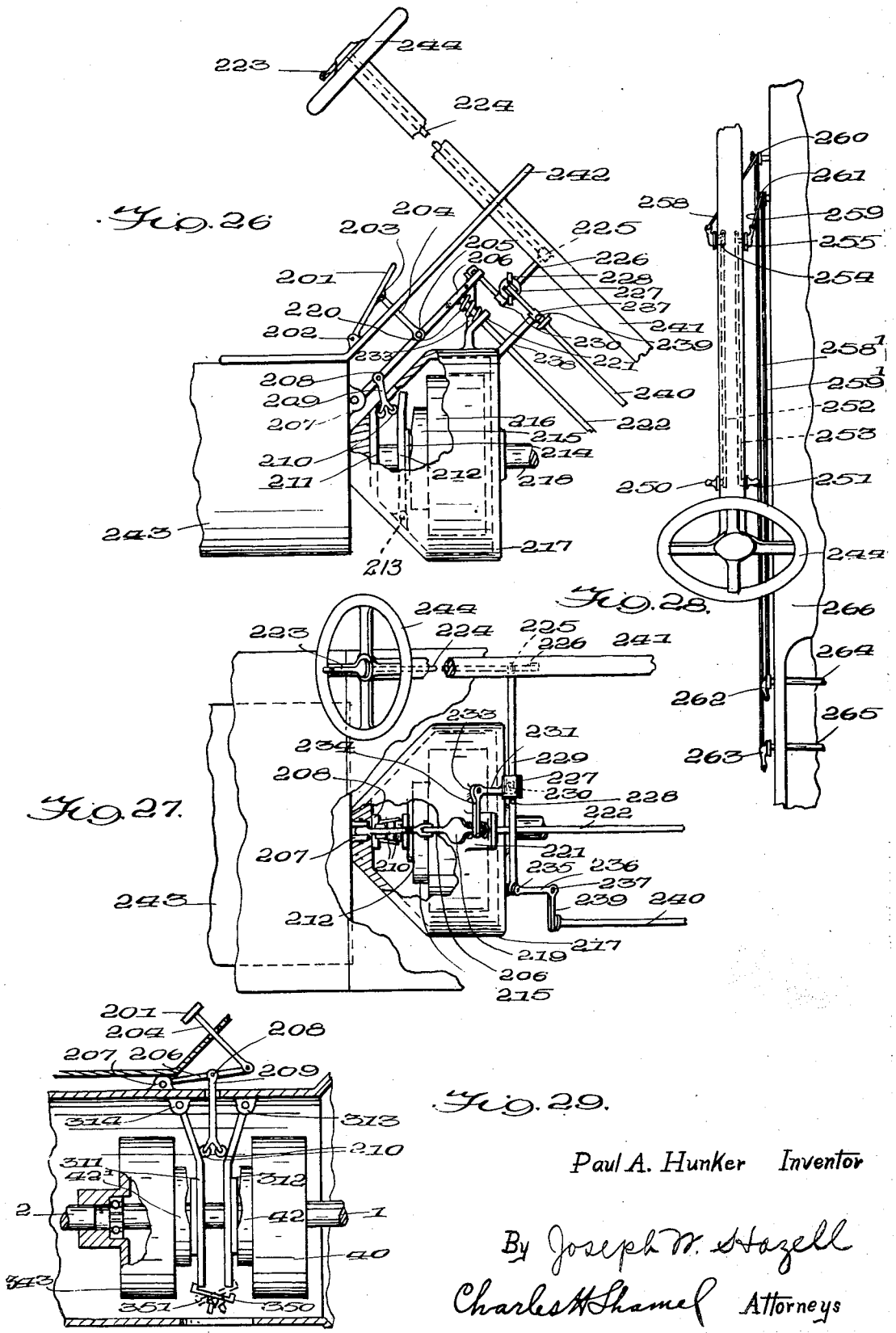
Paul A. Hunker  Inventor
By Joseph W. Hazell
Charles H. Shamel  Attorneys Dec. 15, 1931.  P. A. HUNKER  1,836,074
GEAR RATIO CHANGING MECHANISM
Filed Sept. 12, 1927     11 Sheets-Sheet 11
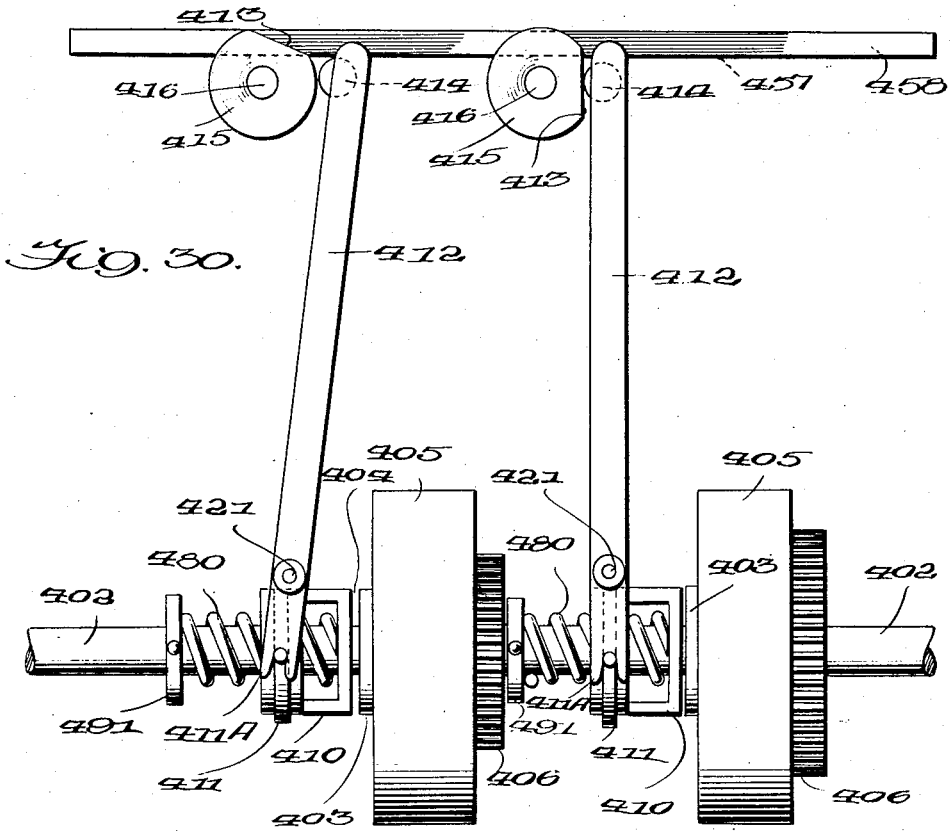
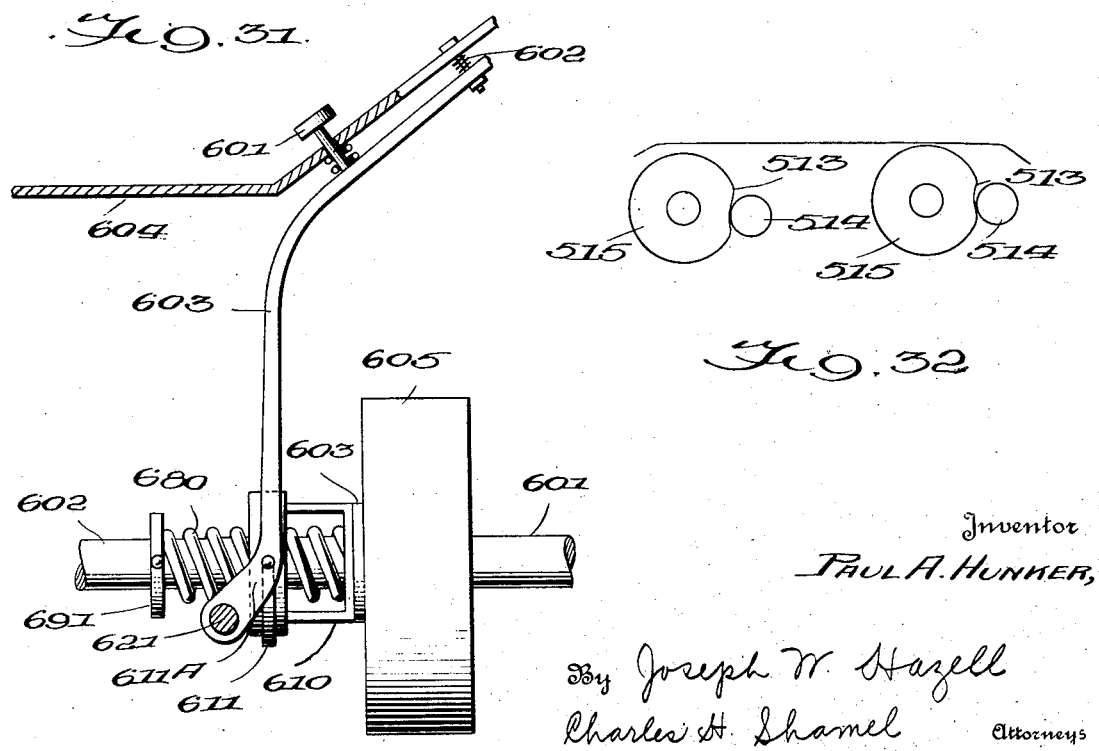

Patented Dec. 15, 1931

1,836,074

UNITED STATES PATENT OFFICE

PAUL A. HUNKER, OF CHICAGO, ILLINOIS, ASSIGNOR OF FIFTY PER CENT TO RAY E. BAUDER, OF CHICAGO, ILLINOIS

GEAR RATIO CHANGING MECHANISM

Application filed September 12, 1927. Serial No. 219,105.

This invention, in its broadest aspect, relates to automatically operated mechanism for changing gear ratios, and is particularly applicable to automotive vehicles, though not limited thereto.

A broad object of the invention is to provide an automobile transmission which includes mechanism for automatically changing the driving gear ratios, said mechanism being automatically regulated and actuated by controlling means operatively dependent on the speed and load of the vehicle.

Another object of the invention is to provide such a mechanism which includes a series of constantly enmeshed gears.

Another object is to provide such a mechanism in which the driving connection between the engine and the driving wheels of the vehicle is not broken during the changing of the driving gear ratio, and in which the changing of the gear ratio is simply, quickly, smoothly and surely effected under any load or grade conditions.

Still another object of the invention is to provide such a mechanism which permits the vehicle to be driven in high gear ratio at low speed, without changing to a lower gear ratio until it becomes necessary to avoid imposing strain on the engine, said mechanism being controlled by the speed and load of the driving wheels, and being automatically operated to change the gear ratio whenever necessary to relieve the engine of strain.

A further object is to combine, in such a mechanism, the clutch, or other means for connecting the engine drive with the driven mechanism, with the engine fuel feed control, whereby both may be operated concurrently by foot pedal or by a hand lever on the steering column or by other convenient means.

A further object of the invention is to provide an automatic gear ratio changing mechanism which may be constructed to permit racing of the engine by hand control only; in which noiseless herringbone or other quiet gears may advantageously be used; and also, without tilting the engine, a straight line worm drive, thereby permitting a noticeable decrease in the over all height of the vehicle.

Still further objects of the invention include the provision of an automatic gear ratio changing mechanism in which two different speed ratios may be secured from one set of intermeshed gears by using either gear as a driving or driven gear; which permits starting of the vehicle in either intermediate or low gear; which permits the vehicle to be rocked back and forth when necessary to get the vehicle out of ruts, sand, or mud holes; in which the speed of the vehicle may be controlled by a single operating lever; in which the vehicle may be started and accelerated by hand from the steering wheel or column, or other convenient location; which is so constructed and operated as to permit both feet of the driver to be used for braking; and which permits the complete control and operation of a combustion engine driven vehicle by only two operating levers or controls, one of which may be used for starting and accelerating, and the other for braking and stopping.

Other and further objects of the invention will appear from the following description, taken in connection with the accompanying drawings, which illustrate, by way of example, a preferred embodiment of the invention, but which are not to be taken as a definition of the limits thereof, reference being had to the appended claims for that purpose.

The invention, broadly stated, includes driving means, such as the internal combustion engine of a motor driven vehicle; driven means, such as the driving wheels of such a vehicle; a plurality of sets of constantly intermeshing transmission gears for driving the vehicle or other driven means at different gear ratios; clutch means for each of said sets of transmission gears; governor means controlled by the speed and load of the vehicle for selectively and alternatively bringing into action said clutch means; and other combinations, means and instrumentalities for accomplishing the foregoing objects of the invention and hereinafter more fully described, including their equivalents within the scope of the appended claims.

In the drawings:

Fig. 1 is a top plan view of a preferred form of mechanism embodying the invention;

Fig. 2 is a side elevation, partly in section, taken approximately along the line G—G of Fig. 1, with certain parts omitted for clearer illustration;

Fig. 3 is a side elevation of the rack bar and associated mechanism shown in Fig. 1;

Fig. 4 is an enlarged top plan view, partly broken away, of the rack bar and rack bar plate;

Fig. 5 is a side elevation, partly in section, and taken along the line H—H of Fig. 1;

Fig. 6 is an end elevation, partly in section, and taken on the line K—K of Fig. 1;

Fig. 7 is an end elevation, partly in section, and taken on the line J—J of Fig. 1;

Fig. 8 is a sectional elevation of the governor mechanism;

Fig. 9 is a sectional elevation of the governor of Fig. 8, showing a different position of the parts;

Fig. 9a is a similar view of a modification thereof, on a reduced scale;

Fig. 10 is a side elevation of the governor mechanism of Fig. 9, showing the emergency low gear hooks associated therewith;

Fig. 11 is a view similar to Fig. 10, showing the parts in another position;

Fig. 12 shows in top plan a modified form of clutch engaging mechanism;

Fig. 12a is a perspective view of the governor casing;

Fig. 13 is a side elevation of the clutch engaging mechanism of Fig. 12;

Fig. 14 is a top plan view of the cam actuated clutch operating mechanism;

Fig. 15 is a side elevation of the cam actuated clutch operating mechanism shown in Fig. 14;

Fig. 16 is a top plan view of one part of the cam arm mechanism of Fig. 14;

Fig. 17 is a side elevation thereof;

Fig. 18 is a top plan view of the cooperating part of said cam arm mechanism;

Fig. 19 is a side elevation thereof;

Fig. 20 is a top plan view of a modified form of governor-controlled clutch actuating mechanism;

Fig. 21 is an end elevation, partly in section, taken on the line R—R of Fig. 20;

Fig. 22 is a top plan view of another modified form of governor-controlled clutch actuating mechanism;

Fig. 23 is a top plan view of a modified form of the mechanism shown in Fig. 1;

Fig. 24 is a side elevation of part of the mechanism of Fig. 23, and taken on the line L—L of Fig. 23;

Fig. 25 is a perspective view of a modified form of rack bar control;

Fig. 26 is a side elevation on a reduced scale of a preferred form of mechanism for controlling the clutch and the fuel feed;

Fig. 27 is a top plan view of the mechanism of Fig. 26;

Fig. 28 is a top plan view of the steering post of Fig. 27, showing also levers for controlling reverse and emergency low gear mechanism and for starting in secondary gear ratio;

Fig. 29 is a side elevation, partly in section, showing a modification of the mechanism for controlling the forward and reverse clutches;

Fig. 30 is a top plan view of an optionally usable clutch actuating mechanism;

Fig. 31 is a side elevation, partly in section, of one form of combined clutch and fuel feed control means;

Fig. 32 is a diagrammatic top plan view of a modified form of the cam mechanism of Fig. 30.

Referring now in detail to the accompanying drawings, and particularly to Fig. 1, in the embodiment of the invention here shown, the shaft 1 represents a driving shaft, which may, for example, be the driving shaft from the clutch and motor of an automotive vehicle. The shaft 1 is revolubly mounted in the casing 102 by means of antifriction bearings 802. Collars 901, 902 and 903 space from the casing 102 the gear wheel 20, revolubly mounted on shaft 1 and serving as a reversing gear. Integral with gear 20, or otherwise fixed thereto, is reversing gear clutch member 40. Splined on shaft 1 adjacent clutch member 40 is a cooperating slidable clutch member 42, which is normally held out of engagement with reversing gear clutch member 40 by a coil spring 41 loosely encircling shaft 1 and of only slightly greater diameter than said shaft, and bearing against the members 40 and 42. The clutch member 42 is engaged with reversing clutch member 40, against the action of coil spring 41, by suitable means hereinafter described. The coil spring 41 also normally holds clutch member 42 in engagement with the forward speed clutch member 43, fixed on shaft 2, revolubly mounted in anti-friction bearings carried in casing 102. The clutch member 42 may be moved, as hereinafter described, along shaft 1 in either direction as rapidly as may be desired, whereby a vehicle may be rocked forwardly and backwardly when necessary to move it out of sand or mud holes or ruts.

Shaft 1, as shown in Fig. 1, terminates within the face of clutch member 43, the end of said shaft being revolubly supported in an antifriction bearing 803 carried within the face of clutch member 43.

Shaft 2, to which is fixed the clutch member 43, is revolubly supported in antifriction bearings 804 and 806 carried respectively by the casing walls 105 and 104. On shaft 2 is slidably mounted a free running clutch engaging collar 44D; also on shaft 2, slidably mounted thereon but rotatable therewith, is the friction clutch member 45D. The cooperating clutch member 46D, which is integral with or otherwise fixed to gear 21D, is rotatably mounted on shaft 2, and is driven thereby when the clutch members 45D and 46D are in engagement. The collar 904 prevents the clutch member 46D from shifting axially on its shaft 2. The parts just referred to constitute a driving unit for driving, in the present example, a vehicle at a certain gear ratio, and may, for convenience, be hereinafter referred to as the D unit.

A plurality of similar units, for driving at different gear ratios, are similarly mounted on shaft 2. The B unit includes the clutch engaging collar 44B and cooperating clutch parts 45B and 46B, to the latter of which is fixed a gear wheel 25B, the parts being held axially in position by collar 905. The A unit includes similar parts similarly numbered, with the gear wheel 27A fixed to clutch member 46A.

The gear wheel 23C is fixed on shaft 2, and rotates therewith, and will be more fully referred to hereinafter.

Referring now more particularly to Fig. 2, the shaft 3 is located immediately below and parallel to shaft 2, being revolubly supported in antifriction bearings 805 and 807 carried respectively by the casing walls 105 and 104, and driving the vehicle at the gear ratio selected and brought into action by the governing mechanism later described.

Shaft 3 carries fixed thereto a gear wheel 22, constantly in mesh with gear wheel 21D on shaft 2. The shaft 3 also carries what may, for convenience, be termed the C unit, which is similar in construction to the A, B and D units already described, and includes clutch engaging collar 44C and cooperating clutch members 45C and 46C similar to the corresponding parts already described. The gear wheel 24 is integral with or fixed to clutch member 46C, is normally freely rotatable on shaft 3 and is constantly in mesh with the gear wheel 23C fixed on shaft 2. It will be understood that the gear ratio is different in each of the units A, B, C and D.

The shaft 3 also has fixed thereon the gear wheels 26 and 28, which are permanently in mesh respectively with gear wheels 25B and 27A rotatably carried on shaft 2. It is to be noted that this permanent intermeshing of the driving gears permits the use of a type of gearing impossible to use where the gears have to be shifted in the ordinary manner, namely herringbone or other noiseless gears, which are not only silent but materially reduce wear.

Gear wheel 29 is fixed on the portion of shaft 3 extending through casing wall 104, and constitutes the governor drive wheel on the driven shaft, said gear wheel driving the governor shaft through intermediate gear wheels 30 and 31, the latter of which is fixed to one end of the governor shaft 4 projecting through the casing end wall 104.

As stated, the invention provides governor means for selectively and alternately actuating the clutch mechanisms already described, and, in the present embodiment of the invention, said governor means includes the following mechanism.

Referring to Fig. 1, the shaft 4, which is parallel to shafts 1, 2 and 3, is rotatably mounted in ball or roller bearings 808, 900 and 801 carried by the casing walls 104, 105 and 102 respectively, and is driven by gear wheel 31 fixed thereon as above stated.

A gear wheel 32, which is fixed on and rotatable with shaft 4, is constantly in mesh with a gear wheel 33, rotatably mounted on shaft 5, the latter fixedly mounted in casing walls 102 and 105. The gear 33 is also permanently in mesh with gear wheel 20 on shaft 1, already described.

Fixed on shaft 4 is a governor case 71, (see also Figs. 8, 9, 10, 11 and 12a). Said case includes a ring 72 supported by radially extending walls or webs 71 fixed on a sleeve 68 pinned or otherwise secured to shaft 4. Said webs may be integral with the sleeve 68 or with the ring 72 or with both, and in order to protect the weighted arms and prevent them from bending or becoming loose as a result of continued operation, the webs 71 are preferably so shaped (see Fig. 12a) as to provide parallel sided openings to accommodate the weighted arms. Encircling shaft 4 is a coil governor spring 75 under compression, which bears at one end against an end of the sleeve 68 and at its other end bears against the sliding governor part 73, which is splined to shaft 4. Secured to sliding governor part 73 by pins inserted in lugs thereon, or otherwise, are a plurality of governor arms 76, which are jointed and weighted at their centers, as shown, and have their other ends secured by hinge pins 99 or otherwise to the sleeve 68. In operation, the weighted centers of the governor arms 76 move radially outwardly or inwardly with respect to shaft 4 within the governor casing ring 72 and within the governor casing walls or webs 71, said ring 72 acting as an outer limit stop, and thus limiting the movement to the right, as viewed in Fig. 1, of the sliding governor part 73.

As shown in Fig. 9a, the ring 72 may be placed to act as a stop directly on the weighted arms 76, and when in this position allows a greater range of movement of the governor arms with no other change in any of the parts.

Secured to the sliding governor part 73, by screws or otherwise, is a guide bar 77 (Figs. 1, 5, and 8 to 11) which in operation is moved axially of the shaft 4 in one direction by the coil compression spring 75, and in the other direction by the weighted governor arms under centrifugal force. Permanently attached to guide bar 77, and movable with it, is a governor rack bar plate 82 (Fig. 1) extending to the left in the direction of shaft 4 as viewed in Fig. 1, and supported at its other end by a collar 915 slidably mounted on shaft 4. Fixedly mounted on the governor rack bar plate 82 is the governor rack bar 81 (Figs. 1, 5, and 8 to 11). By this construction the longitudinal position of the rack bar 81 in the direction of the shaft 4 is determined by the angular velocity of said shaft.

From the construction of the power transmission previously described, it is evident that the speed of revolution of shaft 4 is proportionate to the speed at which the vehicle (in the present embodiment) is driven from shaft 3, that is, the ground speed of the vehicle, which is determined by the load. In accordance with the present invention, the movement and positioning of the rack bar 81, as selectively determined by the governor according to the speed of the vehicle, is utilized to change or maintain the gear ratio at which the vehicle is driven, by bringing into action, or maintaining in action, one or another of the clutches controlling the gearing units A, B, C or D, previously described.

The spring 75, governor arm weights and shaft 4 are so constructed and balanced in their relation to one another that an increase in speed of rotation of shaft 4 produces quickly, and with any desired rapidity, a resultant movement of the movable governor member 73 and consequently of rack bar 81, against the pressure of coil spring 75; but when the governor weights have attained any given expansion, and the rack bar 81 moved thereby to its corresponding position, the speed of rotation of shaft 4 may be decreased without causing the spring 75 to return the governor weights and rack bar 81 to their previously occupied positions, except when the angular velocity of shaft 4 is reduced to a predetermined number of revolutions per unit time. By this construction, quick action can be had in causing the governor to pull its load upward, and slow action in returning, so that the return of a load to the lower ratios will occur only when necessary, or as best manufacturing practice may determine. This action may be emphasized, if desired, by the ball and depression means of Figs. 8 and 9 and hereinafter described.

In order to provide a fixed path of travel for the governor rack bar plate 82 and rack bar 81, governor bar ends 77A, 77B are provided, (see Figs. 1 and 23) rigid with rack bar plate 82 and projecting on either side thereof into governor bar end slides 78A and 78B. Said slides (Figs. 1, 5) are rigidly fastened to casing walls 100 and 103, and cooperate with the rack bar ends to maintain the path of travel of rack bar plate 82 and rack bar 81 at all times parallel to shaft 4 and also to shaft 7 hereinafter referred to.

Various mechanical means, or hydraulic means, may be used between the governor and the gearing units A, B, C and D to control and actuate the gearing unit clutches. In the present embodiment of the invention, the mechanism by which the rack bar 81 selectively brings into action, or maintains in action, one or another of these clutches is as follows.

Referring particularly to Figs. 1, 5 and 7, located above the rack bar 81 and in mesh therewith is a pinion 80 fast on a horizontal shaft 7, rotatably journaled in antifriction bearings 79A and 79B supported on the casing walls 100 and 103 respectively. The shaft 7 is held against axial displacement by stop collars 920 and 921, and has one of its ends (Fig. 7) extending through casing wall 100. Upon this projecting end of shaft 7 is fixed, to rotate with said shaft, a bevel gear 64.

In mesh with bevel gear 64 is a bevel gear 63, fast on a vertically extending shaft 61 which has fixed thereto intermediate its ends a rack engaging spur gear 53, and is rotatably journaled at its top in a bearing bracket 62 and at its bottom in a rack supporting plate 54. The rack supporting plate 54 (Figs. 1, 6) is secured on casing wall 100, and is provided, in the present example of the invention, with four horizontally extending projections (see Figs. 1 and 7), in which are mounted the vertically extending pivot posts 48A, 48B, 48C and 48D, which carry for swinging movement in a horizontal plane the horizontally extending cam actuated clutch operating levers 47A, 47B, 47C and 47D. Each of these levers preferably consists of two parts, jointed on the pivot posts just described, the two parts of each lever being normally held in rigid relation to each other by a flat spring 49, fastened on one of said parts and bearing on the other, as shown in Fig. 1. This construction permits angular movement between the two parts of each lever, namely, the cam arm and the clutch arm, when necessary under tension. The detailed construction of each of these levers in the embodiment of the invention just described is shown in Figs. 14 to 19, wherein, however, a coil spring 10 surrounding pin 11 fixed to one of the arms has been shown in place of the flat spring associated with each of these levers in Fig. 1.

In order to provide greater leverage for the clutch actuating levers, they may be constructed as shown in Figs. 12 and 13, being formed in one piece, and pivoted at one end at 38 on casing wall 101, and having an intermediate clutch actuating portion. At their other ends, said levers are free to be moved by the cam rollers 51 on cams 50 carried by pins 52 which are rotated by pinions 53 fixed thereon and constantly in mesh with rack 57.

Each clutch arm is provided with a yoke 47, which is in operative engagement with its corresponding movable clutch member on shaft 2.

Each cam arm has a cam bearing surface adapted to be acted on by a cam roller 51 carried by a cam 50 fixed on a vertically extending cam post 52 rotatably journaled in the rack supporting plate 54. It is to be noted that the four cams 50 extend in different angular directions, in order that they may successively engage their cooperating cam levers 47. Each cam post 52, with its cam 50, is rotated by a pinion 53, fast on its cam post, and in mesh with the horizontally movable rack 57 (see Fig. 3) which is at all times in engagement with, and is moved by, the rack engaging spur gear 53 already described. A rack bar cover plate 58 is preferably fastened securely to the rack bar supporting plate 54, and serves as a guide and cover for the rack 57 in its travel back and forth between the casing walls 104 and 105.

It will be evident from the foregoing construction that the rack bar 81, which is actuated and positioned by the governor, by rotating pinion 80 on shaft 7, rotates shaft 7 through an angle proportionate to the linear movement of the rack bar 81. Also, through bevel gears 64, 63, shaft 61 and pinion 50A, the rack 57 is moved linearly an amount proportionate to the linear movement of the rack bar 81. This mechanism enables the governor to move and position the rack 57 in accordance with its own angular velocity, which, as has been shown, depends upon the speed of the vehicle, or other driven device.

Linear movement of the rack 57 produces simultaneous angular movement of all the cams 50 through their pinions 53 in mesh with said rack, and by reason of their extending in different angular directions, they successively engage and release their cooperating cam actuated clutch operating levers 47, thereby successively bringing into action the gearing units A, B, C and D of different gearing ratios, through their respective clutches. Should the speed of the vehicle at any time fail to increase, the rack bar 57 remains stationary, and the gearing unit in action at the time remains in action. Should the speed of the vehicle decrease, either by reason of increased load, sufficiently decreased fuel supply or by encountering rough roads or steep hills, the angular velocity of the governor is decreased, spring 75 shifts rack bar 81 to the left as viewed in Fig. 1, and rack 57 is moved a corresponding amount, and will, if the situation requires it, throw out the acting clutch and gearing unit and bring into action the clutch and gearing unit of next lower gearing ratio.

More in detail, the operation of the mechanism so far described is as follows:

Shaft 1 (Figs 1 and 2) delivers the power from the motor into the transmission case. Clutch reverse gear runs idle on shaft 1 when the vehicle is in forward motion. Collar 42, when moved to engagement with clutch reverse gear 40—20, causes a reverse motion of the drive shaft, and by rocking back and forth, the collar 42, first engaging one end and then the other end of clutch faces 40, 43, the vehicle may be rocked back and forth very rapidly at will, and in this manner one of the important objects of the invention is accomplished. The reverse drive is through gear wheel 20, gear wheel 33, gear wheel 32, through shaft 4, gear wheel 31, gear wheel 30 and gear wheel 29, the latter being mounted on the drive shaft 3, (Fig. 2) thus making a complete circuit in the transmission, and delivering the reverse motion to the rear drive shaft. Ordinarily, however, collar 42, being engaged in 43, causes shafts 1 and 2 to revolve in unison. Here it is well to recall that A, B, C and D include four clutches, controlling gear wheel connections with their different ratios between shafts 2 and 3. Cam 50A engages cam lever 47A at all times when the vehicle is not running, or is in the lowest speed while running. The rack bar 57 holds cam lever 50A in position until the centrifugal force of the governor causes rack bar 81 to turn gear wheel 80 on shaft 7, which turns gear wheels 64 (Fig. 3) and 63 and delivers the motion and power to the rack bar 57. As clutch A is engaged the power goes from drive shaft 2 into driven shaft 3 (Fig. 2) and on out into the differential. Gear wheel 29 now revolves gear wheels 30 and 31, the latter being responsible for the revolving of shaft 4. As the governor spreads, it moves rack bar 81, which in turn, through pinion 80, shaft 7, gears 64 and 63, shaft 61 and pinion 53, moves rack 57. Through pinions 53, rack 57 moves cam 50A out of contact with lever 47A and at the same time moves cam 50B into contact with lever 47B. By this motion clutch A has been disengaged and clutch B engaged, and the latter having a higher speed ratio than that of A, causes shaft 3, or the driven shaft, to revolve at a greater rate of speed, which is delivered to the rear axle. As clutch A disengages, clutch B engages, and by means of the rack bar 57 the cams 50A and 50B are so set as to cause a slight overlapping in the operation of clutches A and B. This prevents any loss of power or revolution between the drive and driven shafts, and does not for even a moment allow any power developed by the engine not to be delivered to the rear wheels while the vehicle is in motion. In this manner other important objects of the invention are accomplished. And because the changes are effected automatically and continuously, the gear ratios are changed more quickly than is possible to accomplish by shifting gears by hand, thereby giving faster acceleration or pick-up in the speed of the machine, and a continuous flow and delivery of power to the driving wheels of the vehicle. This eliminates the loss of time while shifting by hand when the motor and the rear wheels are completely disconnected, and will thus enable the vehicle to travel much faster and further in the same length of time that it would otherwise require to make the same shift by hand. In this manner a further desirable result of the invention is attained.

As clutch B is gradually engaged and the higher speed ratio takes effect, the driven shaft 3 is caused to revolve at a higher speed. This in turn reacts on the gradually disengaging clutch A, and in effect turns A from a clutching action into a braking action, against the too sudden transfer of power into clutch B, the final effect being a very smooth, gradual increase of speed, instead of the customary jerk experienced in other types of speed changing mechanism. In this manner still another desired result is accomplished by the invention. It will be observed that this same action takes place in transferring the load from a higher to a lower ratio as well.

Shaft 3, (Fig. 2) or the driven shaft, now traveling at a greater rate of speed, causes governor shaft 4 to travel at an increase of speed as previously explained, through gears 29, 30 and 31, and as the centrifugal motion of the governor becomes greater with the increase of the speed of the shaft, rack bar 57 is caused by the mechanism above described to move still further forward, and cam 50B leaves its point of contact with cam lever 47B, and cam 50C engages cam lever 47C, the latter causing clutch C to carry the load and change the ratio. It will be noted that the throwing of the load from clutch B to clutch C is the same as previously explained for clutch A to clutch B, excepting that the gear ratios are higher. Shaft 3, or the driven shaft, has now increased its speed, and as previously explained, through gear wheels 29, 30 and 31, shaft 4 increases its speed, causing still greater expansion of the governor arms through centrifugal motion, and the rack bar 57, moving further, causes cam 50C to leave its point of contact with cam lever 47C, and cam 50D engages cam lever 47D, the latter engaging clutch 46D—21D. The action between clutches C and D is the same as previously explained between A and B, and between B and C. The vehicle is now traveling in its highest ratio and the governor has reached its peak of expansion, and becomes a flywheel on shaft 4, causing no further change as long as clutch D is engaged. The accompanying drawings show but four speed ratios, but it is to be understood that the invention is by no means limited to that particular number, since more speeds or fewer may be used.

The mechanism, now being in its highest ratio, will remain so until the speed of the rear wheels decreases to such a point that the force exerted by the governor is not equal to that of the opposite force exerted by the governor spring 75, and the rack bar 57 thereupon starts on its backward motion, releasing clutch D through cam 50D, allowing the load to be placed on clutch C, through the cam lever 47C, and further motion of the rack bar in its backward movement returns the load to clutch B and finally to clutch A or the lowest speed ratio. In this manner the change from one gear ratio to another is effected by concurrently loosening the clutches on one clutch driven set of enmeshed gears and tightening it on another, so that during the moment of change there will be a passing instant in which the clutch on the lower gear (ratio) set will act as a brake on the higher gear (ratio) set, and thereby prevent all grabbing and jerking during the act of changing from a low to a high speed or vice versa. It has also been made clear that the means for changing from one gear ratio to another are so simple that it only requires a series of duplicate clutches attached to and controlling different ratios through two constantly enmeshed gears mounted on parallel shafts, making it entirely practical and inexpensive to provide a much greater number of gear ratio changes for the vehicle than is possible where gear ratio changing is effected by the shifting of gears by hand, and numerous gear ratio speeds can be had with little or no increase in the size of the transmission box, especially as the clutching units can be placed on either the upper or lower shafts, or both. In this manner further objects of the invention are attained.

The vehicle, now traveling in its lowest speed ratio, will continue until the speed of the rear wheels again increases the revolution of the governor, causing rack bar 57 to shift the load successively to the higher ratios, B, C and D, as previously explained. Any difficulty or increased load encountered by the rear wheels or the engine, in return, is automatically regulated and cared for by the automatic change of gear ratio in the transmission, which is completely controlled at all times by the speed of the rear wheels. It is also to be noted that any increased speed of the engine shaft causes increased speed of the rear wheels, and this increased speed of the rear wheels is transmitted back into the governor, the increased centrifugal motion of which causes increased ratio in the transmission. In other words, this mechanism enables the vehicle to pick up or increase in speed and cover a greater distance while the change of speed ratio is being made, than if the changes were made by hand, and thereby accomplishes other objects of the invention.

Momentary slowing down of the rear wheels while in the highest ratio, or clutch D, will not cause the governor to be overcome by spring 75, and the shifting of the load of the vehicle back to clutch C, because the power exerted by the centrifugal motion of the governor tends to overcome the opposing power of the spring 75, providing the slowing down of the rear wheels is not maintained to the extent of making it absolutely necessary for a change to a lower gear ratio. This permits the vehicle to be driven in a high gear ratio while at a low speed, without causing a change to a lower gear ratio until the load of the vehicle becomes too great for the load on the engine. In this manner another object of the invention is accomplished. But if the power required to propel the vehicle under difficult conditions becomes so great that the engine cannot supply sufficient power for this purpose, the gears will then be automatically shifted into a lower gear ratio, so that the engine can make the pull on whatever amount of gasoline it is then consuming, and therefore will not be liable to become stalled on railroad crossings, or hills, or in sand, mud, etc. This makes it impossible for the driving mechanism to be put in operation, or maintained in operation with the use of gear ratios which will overtax the engine's power developed with the particular amount of gasoline then being given the engine. This eliminates all unnecessary wear and strain on the engine, and assures the driver of the vehicle of correct performance at all times regardless of driving conditions. In this manner further objects of the invention are accomplished.

The governor arm weights 76 and opposing spring 75 are so balanced that the centrifugal power of the governor on its upward course is sufficient to cause a rapid and properly timed movement through the increasingly higher gear ratios. This opposing spring 75, however, is only sufficiently strong to return the governor arms to their normal inert position, (or back through the decreasing gear ratios into the position corresponding to first or low gear), when the wheels of the vehicle have slowed down to a predetermined speed; otherwise the centrifugal force exerted on the governor arms, once they have become expanded, will of their own force retain their higher position and maintain the mechanism in the higher gear ratios until the automatic selection of a lower gear ratio is necessary, and then, and not until then, will the spring 75 (unless the mechanism is manually operated) cause the governor arms 76 to return downward through the positions corresponding to the lower gear ratios, finally returning to its normal inert position where it actuates the lowest gear. This holding of the mechanism automatically in the higher gear ratios is a desirable feature, as it results in permitting the vehicle to travel in a high gear ratio at a low speed. In this manner another particular object of the invention is attained.

As a double assurance that the governor mechanism will maintain a high ratio while at a low speed, a thrust ball device held in a case 91 (Figs. 7 and 8) is preferably provided. Case 91 is screwed into sliding governor part 73 and within case 91 is a roller ball 90, held by a tension spring 92 against shaft 4. The tension of spring 92 may be adjusted by a set screw 94 as desired. In shaft 4 (Figs. 8, 9) there is a cup depression 95, which may be placed at any point where ball 90 travels along the shaft, depending upon the results desired to be obtained. When the centrifugal motion of governor weights 76' spread to a predetermined point, pressure from spring 93 in case 91 causes roller ball 90 to drop into cup 95 in shaft 4, (see Fig. 9). Governor spring 75 has sufficient power to return 73 to its original position furthest from 71, providing the centrifugal motion of governor weights 76' decreases sufficiently. It will now be understood that the added pressure required to throw ball 90 out of cup 95 helps the centrifugal motion of governor balls 76' to maintain the acting gearing in operation, and it takes a definite increase of speed to cause governor weights 76' to pull ball 90 out of cup 95 in a further forward motion, or into a higher gear ratio. This mechanism is not necessary to the operation of the invention, but merely provides a more definite movement between one gear ratio and another; using the word "definite" in the sense of putting a cup in shaft 4 relative to each gear ratio. This causes the governor's action to hesitate from ratio to ratio, either in its forward or rearward course. The cups in shaft 4 can be so shaped that they will cause action only in a rearward movement of the governor, or vice versa, if desired. Figs. 8 and 9 show cups that cause additional pressure on both the forward and rearward motion of sliding governor part 73, but if pressure is required only on the rearward movement, for example, to prevent the mechanism from going into a lower ratio excepting when absolutely necessary, the cup side facing 71 would not be abrupt, and would cause no resistance whatever in the forward movement of the governor.

Emergency low gear hooks 110 (Figs. 10 and 11) are mounted on shaft 111 (Fig. 1) directly back of governor rack bar plate 82, and parallel to governor bar 77. Shaft 111 is controlled by lever 125 (Fig. 1) which preferably leads to the steering post for control. Hooks 110 drop over governor bar 77 when the driver is desirous of having the vehicle run continuously in lowest gear ratio only. Hooks 110 are only long enough to hook over governor bar 77 when the vehicle is in its lowest ratio, or the sliding part 73 is at its furthest extension from 71. Hooks 110 while remaining over governor bar 77 prevent any speed of governor shaft 4 from causing centrifugal motion in the governor, by not allowing the governor arms to spread. These hooks, when in operation, serve the same purpose as if both ends of the governor arms were fixed to shaft 4, and sliding part 73 becomes temporarily a fixed part. In this manner a further object of the invention is accomplished.

It will be evident from the foregoing that the governor mechanism can be held against forward or backward movement, and any desired gear ratio maintained in operation regardless of the speed of the vehicle, merely by varying the construction of the hooks 110.

Some motors being very powerful, drivers do not use the lowest gear ratio for starting the vehicle from a dead standstill, excepting when absolutely necessary, but for purpose of faster acceleration the highest gear ratio possible to start in is employed. For this purpose hooks 110 are let down into receiving depressions 112 (see Fig. 11) in governor bar 77, and prevent the sliding governor part 73 from returning further than the ends of hooks 110 will permit. The hook ends 110 can be made any thickness desired, according to the ratio which will be used to start the vehicle in, or to the distance covered by 73 between the lowest ratio and the second ratio; or a difference may be made in the thickness of governor bar 77 at the point of the receiving depression 112. The operation of these two combined features, the emergency low gear and starting the vehicle in an intermediate ratio, is as follows: Under normal conditions the hooks are maintained raised above contact with governor bar 77, and play no part whatsoever unless the driver encounters a mud hole, or similar conditions where he is desirous of remaining in the lowest ratio. He then drops hooks 110 (Fig. 5), and even though bar 77 is well beyond their reach, 77 will snap under the hooks when the vehicle slows down equivalent to the lowest ratio. If the driver of the vehicle is desirous of starting the vehicle in the intermediate ratio, he drops the hooks 110 while the governor is spread far enough to allow the hook ends 110 to take their place behind governor bar 77, Fig. 10. It will now be noted that if the driver does not remove the hooks from this position, they will remain, and the vehicle will always be started in a secondary speed. In this manner another object of the invention is accomplished. However, if the driver should encounter something unusual in the way of a mud hole, etc., and be desirous of going into the lowest instead of the intermediate speed, and remaining in low, he would merely lift the hooks 110. The spring 75 would cause bar 77 to return to its furthest position from 71, and if the hooks were then dropped again, the vehicle would remain in low until the hooks were again lifted. The hooks 110 may have beveled outer ends, as in Fig. 5, or may be constructed as shown in Figs. 10 and 11. In Fig. 5 the construction with the pointed ends permits their use in connection with emergency low gear only, and the ability to allow bar 77 to snap under the pointed ends when the vehicle is slowed down sufficiently. The construction shown in Figs. 10 and 11 permits the use of the same arms for holding the bar 77 and other mechanism in such position that the vehicle can be started in the higher gear ratio. But with this construction (Figs. 10 and 11) the governor part 73 must be at its furthest point from 71 before the hooks 110 can be lowered over bar 77 and the latter be engaged for holding it in the lowest speed ratio. The hooks, of course, may be shaped either way, as may be desired.

Referring now to Figs. 20, 21 and 22, these figures show modified or alternative forms of governor controlled clutch actuating mechanism, either of which may be substituted for the corresponding mechanism above described. The governor remains the same as before, as do also the clutch actuating collars on shaft 2. The only differences in construction shown in these figures are in the mechanism between the sliding governor part 73 and the clutch collars 44.

In Figs. 20 and 21, a governor bar tube 77' is moved axially of shaft 4 by sliding governor part 73, but is held against rotation with said shaft by end supporting slide bearings 124. Governor bar tube braces 114 extend from the governor bar tube 77' to a collar 126 loose on shaft 4, and aid in maintaining said governor bar tube in its position transverse to shaft 4.

A rack 119 is fixed on the casing wall above a slide bearing 124, and in mesh therewith is a pinion 120 fixed on a pin 117 rotatably mounted in the governor bar tube 77'. Also fixed on said pin 117 is a second pinion 116 in mesh with one end of a longitudinally movable rack 115, which at its other end meshes with a pinion 116' on a pin 118 rotatably mounted in the governor bar tube 77'. Fixed on pin 118 is a multiple cam 121, here shown as having three cam arms, each one of which is adapted to engage one of three contact plates 123 and move it in the direction of the clutch actuating rod 122, to which each plate is attached.

Movement to the left, as viewed in Fig. 20, of sliding governor part 73, causes like movement of the governor bar tube 77'. This movement, through rack 119, pinion 120, pin 117, pinion 116, rack 115, pinion 116', and pin 118, rotates the multiple cam 121, and causes its cam arms successively to engage the cam plates 123 and consequently successively to move the clutch rods 122 in order successively to actuate a series of clutches 44 controlling gearing units of different gearing ratio, similar to these hereinbefore described, but actuated, as shown in Fig. 22, by bell crank levers 86 pivoted at 87 or by other suitable means.

Referring to Fig. 22, the construction here shown differs from that of Figs. 20 and 21 in that the governor bar tube 77' is provided at one end with a roller 85' bearing on the casing side wall, and at its other end with a roller 85, which successively engages and moves the contact plates 123 already described, in order to successively actuate the clutches of the different gearing units.

In Figs. 23 and 24 there is shown a modified form of the mechanism illustrated in Fig. 1. In this modified form, certain changes have been made, and these include a shifting of the governor shaft and governor mechanism to the opposite, or left side of the gear case, as viewed in Fig. 23. Shaft 7 has been made somewhat longer, as later described, but since shafts 2 and 2' are thus closed to shaft 4, gear wheel 33 has been eliminated.

It will also be seen that, by this construction, the power for driving the vehicle can be taken directly from the top shaft 2, 2', instead of from the lower shaft 3, thereby accomplishing one of the objects of the invention.

Furthermore, in these figures the clutching units have been shifted, and appear, from left to right as viewed in Fig. 23, in the order C, A, B, D. The cams 50A, 50B, 50C, 50D, can, of course, be adjusted to whatever direction may be desired, in order to operate the clutches in the desired sequence.

A different form of clutch engaging collar has been shown on shaft 1, to cooperate with the adjacent clutch members 40 and 43, the functions of these parts remaining the same as before. It will be understood, however, that any suitable form of clutch may be used.

Also, in this modification, the gear mechanism between shaft 7 and rack bar 57 has been considerably simplified, and the power from the governor is delivered in a more direct manner. The shaft 61, shaft supporting bracket 62, gear wheel 53 and bevel gear wheels 63 and 64 formerly described (Figs. 1, 2 and 6) have been eliminated, and in their stead the following mechanism has been substituted.

Referring to Figs. 23, 24 and 25, shaft 7 extends through casing wall 100 to casing wall 101, where its end is rotatably supported at 79C. An intermediate supporting bearing has been provided for shaft 2 at 35 (Fig. 24), shaft 7 crossing over clear of support 35 and shaft 2. Fixed on shaft 7 near its end adjacent casing wall 101, to rotate with said shaft, is a pinion 64' which is constantly in mesh with a horizontally disposed rack 55 secured on the top face of rack bar 57. In this manner shaft 7 is connected directly to rack bar 57 through pinion 64'. In this construction shaft 2 does not pass through casing wall 104, but is in alignment with shaft 2'.

In order to demonstrate the latitude of choice in positioning the clutching units, the clutching and gearing unit B, in Figs. 23 and 24, is illustrated as being mounted on the lower shaft 3, instead of on shaft 2, this change in location making no difference in its construction or its function.

The operation of the mechanism of Figs. 23 and 24 will be evident from the foregoing description. It may be pointed out, however, that, with this mechanism, what may be termed a direct drive is secured merely by actuating the clutching unit C, without driving through any intermediate gears on the lower shaft 3. On all the other gear ratio changes, the drive is from the upper shaft 2 through the selected gear ratio and clutching unit (A, B or D) to the lower shaft 3, through gears 23C and 24, and thence through shaft 2' and into the differential.

Figs. 26 and 27 illustrate control mechanism for driving an automobile in accordance with the present invention. This control mechanism, however, may, if desired, also be used in connection with any type of automobile using the ordinary hand-operated gear shift, but it is particularly adapted to be used in connection with and as controlling mechanism for the automatic gear ratio changing mechanism herein described.

The mechanism of Figs. 26 and 27 provides for the control of the clutch and fuel feed by a single lever or pedal on the floor board. It is preferred that this control be in the form of a foot pedal located approximately in the position of the foot accelerator now commonly used on automobiles of the present day type, though it will be understood that the invention is not limited to this particular location. It is also preferred to use two foot pedals similar in appearance to the clutch and brake pedals now commonly used, but such pedals, in the present instance, both operating brakes, one pedal operating the regular foot brake and the other pedal operating the so-called emergency brake. The fuel feed control lever is preferably placed on the steering post adjacent the steering wheel or in any other suitable or convenient location, and may, if desired, be placed on the instrument board.

Referring now in detail to the construction illustrated in Figs. 26, 27 and 28, the clutch-gas lever 201 is shown in the form of a foot lever on the floor board 242 and is preferably hinged at 202 on said floor board. The foot lever 201 operates both the clutch and the gas or fuel control so that, as soon as pressure is exerted on the foot lever 201, the driving clutch is connected and the vehicle moves.

Further pressure on foot lever 201 does not affect the already engaged driving clutch, but feeds additional gas or fuel to the motor, thus increasing the speed of the vehicle. When used in connection with the herein described automatic gear ratio changing mechanism, this construction allows the driver merely to place his foot on pedal 201 and keep it there so long as he desires the vehicle to continue running. In case this control is used in connection with a vehicle where the gears are shifted by hand, the driver, by releasing the pressure on foot lever 201 to shift his gears, also reduces the fuel supply to the motor, which he must do in an automobile of the present day type.

The foot lever 201 is pivotally connected at 203 with a link 204 whose other end is pivotally attached at 205 to a lever 206, one of whose ends is pivoted to a fixed lug 207.

Pivotally attached to lever 206 at 208 is a depending arm 209 carrying at the end of each of its two downwardly extending diverging arms a roller 210. One of these rollers bears upon a fixed plate 211 and the other bears upon a movable arm 212 hinged at 213 on casing 217 and resting against the clutch engaging collar 215 and constituting a clutch actuating arm. The upper end of the movable arm 212 is inclined so that downward movement of the arm 209, through roller 210, causes the movable arm 212 to move toward the right and operate clutch engaging collar 215 to engage the clutch 216. When the parts are in clutch engaging position, the opposed faces of the plate 211 and movable arm 212 are parallel, so that further downward movement of the rollers 210 by reason of further pressure on foot lever 201 will cause no further action in respect to the clutch 216.

Bearing on the underside of lever 206 is one end of a rod 222 which is normally urged against the lever 206 by a coil spring 220 surrounding said rod and bearing against the fixed support 221. The rod 222 controls the fuel supply to the motor and increases the supply as foot lever 201 moves the lever 206 downwardly. When the foot lever 201 is released completely, the fuel supply to the motor is decreased to its minimum, and the clutch is released or disengaged as above described.

Cooperating with the foregoing mechanism is the hand control of the present invention, which, in the embodiment herein shown, includes the following mechanism. Mounted on the steering wheel column adjacent the steering wheel 244 is a hand lever 223 which is fixed to and rotatable with the rod 224. Fixed at 225 to rod 224 is a lever arm 226 pivotally attached at its other end to a longitudinally movable rod 229, whose other end is pivotally attached at 235 to one arm 236 of a bell crank lever pivoted at 237 to any convenient fixed support and having its other arm 239 bearing against rod 240, which controls the supply of fuel to the motor. Rod 240 is thus actuated through the foregoing mechanism by the hand lever 223 to control the fuel supply by hand, which permits the driver to idle the motor or to race the engine.

Slidable on rod 229 intermediate its ends is a collar 227, which is pivotally attached to the end of one arm 231 of a bell crank lever pivoted at 232 to a fixed supporting lug 233 and having its other arm 234 bearing on the upper face of lever 206. A pin 228 in rod 229 bears against the sliding collar 227 and, when hand lever 223 moves rod 229 in the proper direction to decrease the fuel supply, pin 228 causes collar 227 to move with rod 229 to actuate bell crank lever arm 234 to depress lever 206, thereby, through the mechanism already described, throwing out or disengaging the clutch. By this construction, movement of the hand lever 223 to increase the fuel supply merely moves rod 229 and pin 228 to accomplish that result without affecting collar 227 and consequently without affecting the clutch. It will be noted that this mechanism allows the car to be started and controlled from the steering wheel, which permits the driver to start the car from the steering wheel whether he is in the driver's seat or standing on the running board.

Referring now to Fig. 28, two operating levers or knobs 250 and 251 have been shown on the steering column 241. These knobs in the present instance move the rods 252 and 253, to which they are respectively attached, in the direction of the length of said rods, but it will be appreciated that the knobs 250 and 251 may be constructed to rotate said rods to accomplish the same purpose. As herein shown, the rods 252 and 253 are normally preferably held in their lowered positions by any convenient means, such as a spring, and when it is desired to operate the vehicle in low gear, the appropriate rod 252 or 253 may be actuated and held in position as long as desired. The other rod preferably controls the reversing mechanism. Through suitable mechanism, such as the levers 256 and 257 and links 258 and 259, the rods 252 and 253 are connected at 260 and 261 respectively with connecting rods 258' and 259', which, through suitable connections 263 and 262, control the actuating rods 265 and 264 leading to the reverse and emergency low gear levers 125 and 501 already described.

Referring now to Fig. 29, the construction here shown illustrates a portion of the control system for driving the vehicle by the mechanism just above described.

Where the main drive clutch is eliminated and clutch 43 (Figs. 1, 2, 5, 23 and 24) is used as the main drive clutch between the engine and the transmission, the mechanism includes the pedal 201 above referred to and its associated mechanism as shown in Figs. 26 and 27, including the rollers 210. The mechanism actuated by rollers 210 differs, however, from that previously described, in the following respects. A pair of parallel arms 311 and 312 have their upper ends diverging and pivoted to the casing at 314 and 313 respectively. The rollers 210 extend between and actuate these arms, the rollers 210 normally resting against said arms just above the point where they begin to diverge from each other. Arm 312 actuates the adjacent clutch engaging collar 42 and arm 311 similarly operates clutch engaging collar 42′. The clutch engaging collar 42 cooperates with reversing clutch 42 and the clutch engaging collar 42′ cooperates with forward clutch 343 (see also Figs. 1, 2, 5, 23 and 24). A U-shaped member 350 is pivoted at 351 below the arms 311 and 312 and is normally held by any means such as a spring (not shown) in its dotted line position as shown in Fig. 29. The function of the U-shaped member is to act as a stop for lever 311 in case it is desired to drive the vehicle in reverse gear, or to act as a stop for the lever 312 when it is desired to drive the vehicle in forward gear so that only one of said levers will be moved by the rollers 210 as they are moved downwardly by pressure on foot pedal 201.

A modified form of clutch actuating means between the gearing unit clutches and the rack bar 57 is shown in Fig. 30. As here shown, rack bar 457, below rack bar cover plate 458, when moved linearly as hereinbefore described, rotates cams 415 fixed on posts 416, each cam being provided with a flat face 413. It will be understood that, as above stated, any desired number of these cams may be provided, two being shown in Fig. 30 by way of illustration. Against each cam bears a cam roller 414 carried at one end of a lever 412 pivotally mounted at 421. The other ends of levers 421 actuate the gearing unit clutches as hereinafter described.

It will be noted that the cam faces 413 are successively angularly displaced with respect to each other, that is, face in different directions, in order that, when all of the cams are rotated by rack bar 457, the cam faces 413 may successively come into contact with their respective cam rollers.

Furthermore, the cam faces need not be flat, but in some instances may be concave, as shown in Fig. 32, where the concave cam faces 513 of cams 515 cooperate successively with their respective cam rollers 514. A certain amount of added force is required of the governor mechanism, transmitted through rack bar 457, to rotate the cams against the pressure of the cam rollers caused by springs 480 acting on levers 412 as hereinafter described. It is therefore evident that a greater latitude of speed change of the governor mechanism is permitted without causing any change in the gearing ratio in operation, insuring that the gear ratio will not be changed except when necessary.

The gearing unit clutches, in this embodiment of the invention, are carried on shaft 402, which corresponds to shaft 2 hereinbefore described. On shaft 402 are pinned collars 491 each serving as an abutment stop for one end of a coil spring 480 encircling shaft 402 and bearing at its other end against the interior bottom face of a hollow tubular casing 410, freely mounted on shaft 402. Each casing 410 is circumferentially grooved to receive a collar 411 which cooperates with and is actuated by a yoke 411A carried by or formed as a part of the shorter arm of lever 412.

Gearing unit clutches 405 are carried on shaft 402, the clutch faces 403 of which are normally separated by spaces 404 from the adjacent end of casings 410. When one of the clutches 405 is actuated by spring pressure of casing 410 against clutch face 403, caused by spring 480 when cam roller 414 contacts cam face 413, the clutch 405 which is actuated, and also gear wheel 406 fixed to said clutch, both rotate with shaft 402. The successive action of these clutches brings successively into action the different gearing units in the manner already described.

By the foregoing construction each clutch is maintained in operation by spring pressure. The pressure required to hold springs 480 out of clutch actuating position is transmitted through levers 412 to the cam posts 416. Also, it is only when one clutch is disengaged and another clutch engaged that the governor is required to deliver much energy to the rack bar, because as one clutch disengages and another engages, one spring is contracting while the other is expanding, thereby tending to equalize the pressure put on the rack bar by the governor to cause a change in the gearing ratio. One advantage of this construction is that the pressure necessary to maintain a clutch at work is produced at the clutch by a spring, thereby diminishing the tension on the rack bar.

Referring now to Fig. 31, a form of clutch control is here shown differing in some respects from that shown in Fig. 26. The clutch 605 is the main clutch between the engine shaft 601 and transmission shaft 602. Collar 691, spring 680, collar 611, casing 610 and clutch face 603 correspond to the similar parts shown in Fig. 30. The arm 603 of yoke 611A is pivoted at one end at 621, is relatively long to provide considerable leverage, and extends upwardly beneath the floor 604 of the vehicle. A spring 602 holds arm 603 normally so that clutch 605 is not engaged, the arm 603 being moved by foot pedal 601 against the action of spring 602, to engage the clutch. The arm 603 may, as shown at 206 in Fig. 26, also control the fuel feed upon operation of the foot pedal 601. It will also be understood that, owing to the pressure of spring 680, tending to engage the clutch, only a light pressure is required on foot pedal 601 to overcome the action of spring 602 and cause the clutch to be engaged.

It will be seen that by the foregoing construction an automatic gear ratio changing mechanism has been provided by which the driving gear ratios of an automotive vehicle may be automatically regulated and actuated by controlling means operatively dependent on the speed and load of the vehicle; which includes a plurality of units of constantly enmeshed driving gears; in which the driving connection between the engine and the vehicle is not broken during the changing of the driving gear ratios, in which the changing of the ratios is effected without loss of speed and without loss in the transmission of power and which is quickly and smoothly accomplished; in which the vehicle may, when desired, be driven in high gear ratio at low speed, but which is automatically operated when necessary to avoid imposing strain on the engine, to change the gear ratio; in which a single control is provided for operating both the clutch and the fuel feed control; in which herringbone or other noiseless driving gears may be used; which permits the vehicle to be rocked back and forth under power when necessary to get the vehicle out of ruts, sand or mud holes; which permits the vehicle to be started and accelerated by hand from the steering column; which is so constructed that both feet of the driver are free to be used for braking when necessary and which provides for complete control and operation of a motor driven vehicle by only two operating levers or controls; and in which other objects of the invention hereinabove stated, together with other objects and advantages which will be apparent from the foregoing, are accomplished.

What is claimed is:

1. In a gear ratio changing mechanism, driving means, driven means, means connecting said driving and driven means including a plurality of sets of constantly enmeshed driving gears of different gear ratios, yieldably actuated clutching means controlling each of said sets of driving gears, and rotary governor means positively rotated by the driven means and controlled by the speed and load of the vehicle for successively bringing into action said clutching means controlling said sets of driving gears of increasingly higher driving ratios as the speed of said vehicle increases, said governor means automatically and simultaneously yieldably releasing one clutch and yieldably engaging another to produce a braking action during the change of driving gear ratio.

2. In a gear ratio changing mechanism, driving means, driven means, means connecting said driving and driven means and transmitting power continuously from said driving to said driven means and including a plurality of sets of constantly enmeshed driving gears of different gear ratios, rotary governing means positively rotated by the driven means and controlled by the speed of said driven means for alternatively and selectively bringing into action said sets of driving gears according to the speed of said driven means, and means for delaying the action of the governor means between each speed change whereby the speed of the driven means may be varied without causing a change in the acting driving gear ratio.

3. In a gear ratio changing mechanism, driving means, driven means, means constantly connecting said driving and driven means and transmitting power continuously from said driving to said driven means and including a plurality of sets of constantly enmeshed driving gears of different gear ratios, governing means controlled by the speed of said driven means for alternatively and selectively bringing into action said sets of driving gears according to the speed of said driven means, and locking means associated therewith for locking out of operation one of said sets of driving gears.

4. In a gear ratio changing mechanism, driving means, driven means, means connecting said driving and driven means including a plurality of sets of constantly enmeshed driving gears of different gear ratios, governing means controlled by the speed of said driven means for alternatively and selectively bringing into action said sets of driving gears according to the speed of said driven means, and means optionally movable into and out of engagement with the governing means for positively locking said mechanism in low gear and for preventing said governing means from bringing into action other driving gears.

5. In a gear ratio changing mechanism, driving means, driven means, means connecting said driving and driven means including a plurality of sets of constantly enmeshed gears of different gear ratios, governor means controlled by the speed of said driven means for selectively and successively bringing into action said sets of enmeshed gears, and means movable manually into and out of engagement with the governor for positively maintaining said gearing in a desired ratio regardless of the speed of said driven means.

6. In a gear ratio changing mechanism, driving means, driven means, a plurality of sets of constantly enmeshed driving gears for transmitting power from the driving means to the driven means, clutch means for each set of gears, an actuator for each clutch means, governor means, driven by the driven means, and operators responsive to the action of the governing means, and cooperable with said actuators to bring into action said sets of gears as the speed of the driven means varies, said operators being spaced, arranged, and designed so that one operator engages and moves its clutch actuator into clutch releasing position while another operator simultaneously engages and moves its clutch actuator into clutch engaging position whereby an overlapping engagement of the clutches provides a braking effect during the change of the gear ratio to deliver a continuous flow of power from the driving means to the driven means.

7. In a gear ratio changing mechanism, driving means, driven means, a plurality of sets of constantly enmeshed driving gears of different gear ratios for transmitting power from the driving means to the driven means, clutch means, one for each set of gears, actuating levers, one for each clutch means, cam elements, one for each lever, said cam elements being arranged to actuate the levers in succession, governor means driven by the driven means, and means responsive to the action of the governor means as the speed of the driven means varies for automatically and successively bringing into action said sets of driving gears through the operation of the levers by the cam elements, said driving, driven and governor means being arranged in side by side and substantially parallel relation with the cam elements and levers interposed between the driving and governor means.

8. In a gear ratio changing mechanism, driving means, driven means, a plurality of sets of constantly enmeshed driving gears for transmitting power from the driving means to the driven means, clutch means, one for each set of gears, actuating levers, one for each clutch means, rotary cam elements, one for each lever, said cam elements extending in different angular directions to operate the levers in succession, governor means driven by the driven means, and means responsive to the action of the governor means as the speed of the driven means varies to operate the cam elements for automatically and successively bringing into action said sets of driving gears.

9. In a gear ratio changing mechanism, driving means, driven means, a plurality of sets of constantly enmeshed driving gears for transmitting power from the driving means to the driven means, clutch means, one for each set of gears, actuating levers, one for each clutch means, rotary cam elements, one for each lever, said cam elements extending in different angular directions to operate the levers in succession, a pinion connected with each cam element, a rack bar in mesh with said pinions, governor means driven by the driven means, and means responsive to the action of the governor means as the speed of the driven means varies for actuating said rack bar to automatically and successively bring into action said set of driving gears.

10. In a gear ratio changing mechanism, driving means, driven means, a plurality of sets of constantly enmeshed driving gears for transmitting power from the driving means to the driven means, clutch means, one for each set of gears, actuating levers, one for each clutch means, rotary cam elements, one for each lever, said cam elements extending in different angular directions to operate the levers in succession, a pinion connected with each cam element, a rack bar in mesh with said pinions, a driving pinion in mesh with said rack bar, governor means driven by the driven means, and means responsive to the action of the governor means as the speed of the driven means varies for rotating said driving pinion.

11. In a gear ratio changing mechanism, driving means, driven means, a plurality of sets of constantly enmeshed driving gears of different gear ratios for transmitting power from the driving means to the driven means, clutch means, one for each set of gears, actuating levers, one for each clutch means, governor means driven by the driven means, and means for actuating said levers in succession from said governor means, said lever actuating means including a pair of endwise movable members, and means associated therewith whereby the movement of one lever will effect movement of the other, one of said members serving to actuate the levers and the other member being actuated by the governor means as the speed of the driven means varies.

12. In a gear ratio changing mechanism, driving means, driven means, a plurality of sets of constantly enmeshed driving gears of different gear ratios for transmitting power from the driving means to the driven means, clutch means, one for each set of gears, actuating levers, one for each clutch means, governor means driven by the driven means, and means for actuating said levers in succession from said governor means, said lever actuating means including a pair of endwise movable members, and a shaft extending between and connected with said members for moving one by the other, one of said members serving to actuate the levers and the other member being actuated by the governor means as the speed of the driven means varies.

13. In a gear ratio changing mechanism, driving means, driven means, a plurality of sets of constantly enmeshed driving gears of different gear ratios for transmitting power from the driving means to the driven means, friction clutch means, one for each set of gears, actuating levers, one for each clutch means, cam elements, one for each lever, said cam elements being disposed to operate the clutch means through the levers successively and to effect a gradual release of one clutch before a complete engagement of the succeeding clutch, governor means driven by the driven means, and means responsive to the action of the governor means as the speed of the driven means varies for actuating the cam elements automatically and successively.

14. In a change speed transmission for motor vehicles, a driven shaft, aligned driving and lay shafts, gear means for transmitting power from the driving shaft to the driven shaft through the lay shaft including a forward driving gear on the lay shaft and a reversing gear on the driving shaft, a slidable clutch member splined on the driving shaft between said gears, reversing and forward speed clutch members on opposite sides of said sliding clutch member and fixed to the lay shaft and reversing gear, respectively, and means for moving the slidable clutch member alternately into and out of clutched engagement with said other clutch members for rocking the vehicle back and forth under power.

15. In a change speed transmission for motor vehicles, a driven shaft, aligned driving and lay shafts, gear means for transmitting power from the driving shaft to the driven shaft through the lay shaft including a forward driving gear on the lay shaft and a reversing gear on the driving shaft, a slidable clutch member splined on the driving shaft between said gears, reversing and forward speed clutch members on opposite sides of said sliding clutch member and fixed to the lay shaft and reversing gear, respectively, means for moving the slidable clutch member alternately into and out of clutched engagement with said other clutch members for rocking the vehicle back and forth under power, and spring means for normally holding the slidable clutch member out of engagement with the clutch member on the reversing gear.

16. In a change speed transmission for motor vehicles, a driven shaft, aligned driving and lay shafts, gear means for transmitting power from the driving shaft to the driven shaft through the lay shaft including a forward driving gear on the lay shaft and a reversing gear on the driving shaft, a slidable clutch member splined on the driving shaft between said gears, reversing and forward speed clutch members on opposite sides of said sliding clutch member and fixed to the lay shaft and reversing gear, respectively, and means for moving the slidable clutch member alternately into and out of clutched engagement with said other clutch members for rocking the vehicle back and forth under power, said driving shaft terminating at and journaled within said forward speed clutch member.

17. In a gear ratio changing mechanism, driving means, driven means, a plurality of sets of constantly enmeshed forward driving gears of different gear ratios connecting the driving means to the driven means, clutch devices for the respective sets of gears, means for operating the clutch devices, a shaft driven by the driven means, governor means operated by said shaft, means responsive to the action of the governor to automatically and successively operate said clutch devices as the speed of the driven shaft varies, said last named means including an intermeshing rack and pinion construction with the rack arranged to have movement parallel to said shaft, said rack being connected with and moved by the governor means, said pinion being connected with the means for operating the clutch devices and means for guiding and holding the rack parallel with said shaft.

18. In an automotive vehicle, driving means therefor, wheels driven thereby, constantly enmeshed reverse gears and constantly enmeshed forward gears connecting said driving means and wheels, clutch devices controlled by the speed of said driven wheels for selectively and successively bringing into action said forward driving gears, a clutch member connected with one of the reverse gears, a clutch member connected with one of the forward driving gears and arranged opposite the first mentioned clutch member, a clutch element arranged between said clutch members and operable independently of the clutch devices for alternately bringing into action said reverse and said forward driving gears to rock the vehicle back and forth under power.

In testimony whereof I affix my signature.
PAUL A. HUNKER.